(12) United States Patent
Zong et al.

(10) Patent No.: US 11,190,602 B2
(45) Date of Patent: Nov. 30, 2021

(54) COMMUNICATION METHOD AND COMMUNICATIONS DEVICE

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/171,539

(22) Filed: Feb. 9, 2021

(65) Prior Publication Data

US 2021/0168215 A1 Jun. 3, 2021

Related U.S. Application Data

(63) Continuation of application No. PCT/CN2019/100418, filed on Aug. 13, 2019.

(30) Foreign Application Priority Data

Aug. 13, 2018 (CN) .......................... 201810918830.0
Jun. 17, 2019 (CN) .......................... 201910523684.6

(51) Int. Cl.
*G06F 15/16* (2006.01)
*H04L 29/08* (2006.01)
(Continued)

(52) U.S. Cl.
CPC ............ *H04L 67/16* (2013.01); *H04L 67/146* (2013.01); *H04L 67/2819* (2013.01);
(Continued)

(58) Field of Classification Search
CPC ... H04L 67/16; H04L 67/146; H04L 67/2819; H04L 67/2838; H04W 4/50; H04W 48/18
(Continued)

(56) References Cited

U.S. PATENT DOCUMENTS 7,000,019 B2 * 2/2006 Low .................... G06Q 20/40
455/2.01
7,133,674 B2 * 11/2006 Rajkotia ............... H04W 76/15
455/436

(Continued)

FOREIGN PATENT DOCUMENTS

CN 102131311 A 7/2011
CN 105592486 A 5/2016
(Continued)

OTHER PUBLICATIONS

3GPP TS 23.502 V15.2.0, "3rd Generation Partnership Project; Technical Specification Group Services and System Aspects; Procedures for the 5G System; Stage 2 (Release 15)," Jun. 2018, 308 pages.
(Continued)

*Primary Examiner* — Moustafa M Meky
(74) *Attorney, Agent, or Firm* — Conley Rose, P.C.

(57) ABSTRACT

A communication method and a communications device, where the communication method includes: receiving a first message sent by a first service instance, where the first message includes a target identifier; and sending, based on the first message, a second message to a second service instance that has a binding relationship with the target identifier.

26 Claims, 10 Drawing Sheets

(51) Int. Cl.
  *H04W 4/50* (2018.01)
  *H04W 48/18* (2009.01)
(52) U.S. Cl.
  CPC ........... *H04L 67/2838* (2013.01); *H04W 4/50* (2018.02); *H04W 48/18* (2013.01)
(58) Field of Classification Search
  USPC ........................................................ 709/227
  See application file for complete search history.

(56) References Cited

U.S. PATENT DOCUMENTS

| | | | | |
|---|---|---|---|---|
| 7,334,017 | B2* | 2/2008 | Hawkes | H04M 3/493 709/204 |
| 7,570,961 | B2* | 8/2009 | Rajkotia | H04W 76/15 455/456.2 |
| 2002/0055973 | A1* | 5/2002 | Low | H04L 12/1822 709/204 |
| 2002/0055974 | A1* | 5/2002 | Hawkes | H04M 3/493 709/204 |
| 2002/0073150 | A1* | 6/2002 | Wilcock | H04L 67/38 709/204 |
| 2002/0073210 | A1* | 6/2002 | Low | G06Q 40/04 709/228 |
| 2002/0091832 | A1* | 7/2002 | Low | G06Q 30/02 709/227 |
| 2005/0037792 | A1* | 2/2005 | Rajkotia | H04W 76/15 455/517 |
| 2006/0045129 | A1* | 3/2006 | Hart | H04W 4/20 370/468 |
| 2006/0270428 | A1* | 11/2006 | Rajkotia | H04W 76/15 455/517 |
| 2011/0222442 | A1* | 9/2011 | Cole | H04L 67/1014 370/276 |
| 2017/0339609 | A1 | 11/2017 | Youn et al. | |
| 2018/0063258 | A1 | 3/2018 | Wang et al. | |
| 2019/0090164 | A1 | 3/2019 | Ding et al. | |
| 2020/0037376 | A1 | 1/2020 | Hou et al. | |

FOREIGN PATENT DOCUMENTS

| | | |
|---|---|---|
| CN | 107222392 A | 9/2017 |
| CN | 108366380 A | 8/2018 |
| CN | 108462735 A | 8/2018 |
| WO | 2018141266 A1 | 8/2018 |

OTHER PUBLICATIONS

3GPP TS 29.244 V15.2.0, "3rd Generation Partnership Project; Technical Specification Group Core Network and Terminals; Interface between the Control Plane and the User Plane Nodes; Stage 3 (Release 15)," Jun. 2018, 176 pages.

3GPP TS 29.502 V15.0.0, "3rd Generation Partnership Project; Technical Specification Group Core Network and Terminals; 5G System; Session Management Services; Stage 3 (Release 15)," Jun. 2018, 116 pages.

3GPP TS 23.527 V0.1.0, "3rd Generation Partnership Project; Technical Specification Group Core Network and Terminals; 5G System; Restoration Procedures (Release 15)," Jul. 2018, 9 pages.

NTT DOCOMO, "New Solution: Temporary bindings between the I 1-56 service instances," SA WG2 Meeting #127-bis S2-185461, Jan. 6, 2018, 6 pages.

Huawei et al., "Resource management of UPF shared by multiple SMFs", SA WG2 Meeting #127 S2-183458, Apr. 16-20, 2018, China, 5 pages.

* cited by examiner

COMMUNICATION METHOD AND COMMUNICATIONS DEVICE

CROSS-REFERENCE TO RELATED APPLICATIONS

This application is a continuation of International Patent Application No. PCT/CN2019/100418, filed on Aug. 13, 2019, which claims priority to Chinese Patent Application No. 201810918830.0, filed on Aug. 13, 2018 and Chinese Patent Application No. 201910523684.6, filed on Jun. 17, 2019. All of the aforementioned patent applications are hereby incorporated by reference in their entireties.

TECHNICAL FIELD

This application relates to the communications field, and more specifically, to a communication method and a communications device.

BACKGROUND

In a process of providing a communication service for one user equipment, a plurality of service instances are usually required to exchange information with each other. For example, a manufacturer service instance sends a message related to a user equipment to a service framework, and the service framework selects one consumer service instance from a plurality of consumer service instances, and sends the message related to the user equipment to the consumer service instance.

However, in some scenarios, a same service instance is required to serve a same user equipment. The foregoing method cannot ensure that the same service instance serves the same user equipment in a plurality of message exchange processes. In other approaches, either of two service instances that are performing communication related to a same user equipment notifies the peer service instance to subsequently send a message related to the user equipment to the service instance, to complete binding between the service instances. However, the foregoing method for direct binding between the service instances increases coupling between the service instances and increases complexity in processing of the service instances.

SUMMARY

This application provides a communication method and a communications device, to reduce complexity in processing of service instances.

According to a first aspect, a communication method is provided. The communication method includes: receiving a first message sent by a first service instance, where the first message includes a target identifier; and sending, based on the first message, a second message to a second service instance that has a binding relationship with the target identifier.

Binding between the target identifier and the service instance in the foregoing technical solution is used to replace direct binding between service instances in other approaches. This can reduce coupling between service instances, and reduce complexity in processing of the service instances.

It should be understood that the service instance may be a network function in a fifth generation (5G) mobile communications system, or may be a service provided by a network function. With evolution of technologies, the service instance may alternatively be a service instance separated from a network function. This is not specifically limited in this embodiment of this application.

It should be understood that the first message is a message related to a user equipment. The first message is used to request a second service. The second service is a service that is related to the user equipment and that is provided by the second service instance.

With reference to the first aspect, in some implementations of the first aspect, the communication method further includes: when there is no service instance that has a binding relationship with the target identifier, obtaining an identifier of a target service set based on the first message; selecting a third service instance from the target service set based on the identifier of the target service set; and sending a third message to the third service instance based on the first message.

In the foregoing technical solution, when there is no service instance that has a binding relationship with the target identifier, a new service instance can be quickly and effectively selected as a target service instance based on the identifier of the target service set. This ensures service reliability.

With reference to the first aspect, in some implementations of the first aspect, the communication method further includes: obtaining the identifier of the target service set from the first message, where the first message further includes the identifier of the target service set; obtaining the identifier of the target service set from the target identifier in the first message, where the target identifier includes the identifier of the target service set; or determining an identifier of a service set as the identifier of the target service set, where the identifier of the service set has a mapping relationship with the target identifier in the first message.

It should be understood that different service sets have different identifiers of the service sets. A location of an information element that is in the first message and that is occupied by the identifier of the target service set is not specifically limited in this embodiment of this application. As described above, the identifier of the target service set may occupy an information element in the target identifier, or may occupy an information element in the first message other than the target identifier; or the identifier of the target service set may be obtained based on the mapping relationship between the target identifier and the identifier of the service set.

With reference to the first aspect, in some implementations of the first aspect, the communication method further includes: receiving a fourth message sent by the second service instance, and obtaining, by a service communication proxy, the binding relationship between the target identifier and the second service instance based on the fourth message.

It should be understood that, in the foregoing technical solution, the service instance sends the fourth message to trigger the service communication proxy to establish the binding relationship between the service instance and the target identifier. In this embodiment of this application, alternatively, the service communication proxy may actively establish the binding relationship between the service instance and the target identifier without being triggered by the fourth message.

With reference to the first aspect, in some implementations of the first aspect, the fourth message is a message related to a user equipment, or the fourth message is a dedicated binding request message.

With reference to the first aspect, in some implementations of the first aspect, the fourth message carries the target identifier.

With reference to the first aspect, in some implementations of the first aspect, the communication method further includes: after receiving the fourth message sent by the second service instance, assigning the target identifier to the second service instance.

The service communication proxy assigns the target identifier to the service instance. This can reduce load of the service instance, and reduce complexity in processing of service instances.

With reference to the first aspect, in some implementations of the first aspect, the communication method further includes: when the message is the message related to the user equipment, adding the target identifier to the fourth message.

After assigning the target identifier, the service communication proxy adds the target identifier to the fourth message. This can ensure that the first service instance can obtain the target identifier after receiving the fourth message to which the target identifier is added and can subsequently send a message to the second service instance including the target identifier. In this way, the service communication proxy can send a message to the second service instance based on the binding relationship between the target identifier and the service instance.

With reference to the first aspect, in some implementations of the first aspect, the fourth message carries at least one of a binding indication or a binding timer, where the binding timer is used to release the binding relationship between the target identifier and the second service instance after the binding timer expires.

It should be understood that a case in which the fourth message carries the binding indication may be understood as an explicit trigger. Certainly, the fourth message may alternatively not include the binding indication. This case may be understood as an implicit trigger. In this case, the service communication proxy directly establishes, after receiving the fourth message, the binding relationship for binding the target identifier and the service instance.

A binding time for binding the service instance and the target identifier can be accurately controlled using the binding timer, such that another service instance can be selected after the binding timer expires. In this way, load balancing is better supported.

With reference to the first aspect, in some implementations of the first aspect, the communication method further includes: receiving a fifth message sent by the second service instance, where the fifth message is used to request to release the binding relationship between the target identifier and the second service instance; or starting the binding timer, and releasing the binding relationship between the target identifier and the second service instance after the binding timer expires.

When the service instance does not need to process a message related to the user equipment, the service instance notifies, using an initiated unbinding request or the binding timer, the service communication proxy to release the binding relationship between the target identifier and the service instance. In the foregoing technical solution, the service communication proxy maintains the binding relationship between the target identifier and the service instance. In comparison with other approaches in which a service instance directly maintains a binding relationship between service instances, the foregoing technical solution can further reduce complexity in processing of service instances.

It should be understood that the service instance may initiate the unbinding request when the service instance has relatively heavy load, goes offline, fails, or the like, to notify the service communication proxy to unbind the target identifier from the service instance. This ensures that a service related to the user equipment can be removed from the service instance in any one of the foregoing cases.

With reference to the first aspect, in some implementations of the first aspect, the fifth message further carries indication information, and the indication information is used to indicate the service communication proxy to bind the target identifier to the third service instance.

The fifth message carries the indication information, to indicate to unbind the target identifier from the original service instance and to bind the target identifier to another service instance. This completes service load transfer between the service instances, and implements load balancing between the service instances.

It should be understood that the second service instance may request to bind the to-be-unbound target identifier to another service instance when perceiving that the other service instance has relatively light load or has better communication quality. However, this is not limited in this embodiment of this application.

With reference to the first aspect, in some implementations of the first aspect, the target identifier is related to one user equipment or a group of user equipments. Target identifiers at different granularities facilitate service management at different granularities.

It should be understood that the target identifier may have different formats. For example, when the target identifier is related to one user equipment, the target identifier may be at least one of an Internet Protocol (IP) address or a port number of the service communication proxy. Alternatively, the target identifier may include an identifier of a service set to which the second service instance belongs and a unique identifier in the service set. Alternatively, the target identifier is a value that is assigned by the service communication proxy and that is unique on the service communication proxy. This is not limited in this application. When the target identifier is related to a group of user equipments, the target identifier may be an identifier of a service set corresponding to the second service instance, or include an identifier of the service set and an identifier of the second service instance or an identifier of the service set and a unique service pointer in the service set, where the service pointer is used to identify the group of user equipments served by the service set, and so on. This is not limited in this application.

It should be understood that a target identifier related to a single user equipment or a target identifier related to a plurality of user equipments may be selected based on a specific requirement. When the target identifier related to the single user equipment or the target identifier related to the plurality of user equipments is selected is not specifically limited in this embodiment of this application.

With reference to the first aspect, in some implementations of the first aspect, the target identifier is one of service pointers configured for the second service instance, and the communication method further includes: receiving a sixth message from the second service instance, where the sixth message is used to request to configure a service pointer for the second service instance; and sending a sixth response message to the second service instance, where the sixth response message includes the service pointer configured for the second service instance.

The service communication proxy configures the service pointer for the service instance. This can implement automatic configuration of the service pointer.

It should be understood that the sixth response message includes one or more service pointers.

It should be understood that the service pointer may be a service pointer related to a single user equipment, or may be a service pointer related to a plurality of user equipments. In other words, one service pointer may correspond to a single user equipment, or may correspond to a plurality of user equipments.

It should be understood that when the service pointer is related to the single user equipment, the service pointer may be in a service pointer range (for example, from 1 to 100).

With reference to the first aspect, in some implementations of the first aspect, the second service instance sends a registration request to the service communication proxy, where the registration request includes at least one of the following: an identifier of a service instance, a service type, manufacturer information, a capacity of the service instance, an area in which the service instance provides a service, a network slice capability supported by the service instance, or an identifier of a service set to which the service instance belongs. Based on different service types, the registration request may further carry other information such as a data network name (DNN).

With reference to the first aspect, in some implementations of the first aspect, before the second service instance sends the registration request to the service communication proxy, the method further includes: discovering, by the second service instance, the service communication proxy.

For example, address information, for example, a fully qualified domain name (FQDN) or an IP address, of a serving service communication proxy may be preconfigured in a configuration file of the second service instance. Alternatively, the service instance discovers a serving service communication proxy using a discovery mechanism. For example, the second service instance may discover the serving service communication proxy by sending a broadcast or multicast message in a network, or using a discovery mechanism similar to a Dynamic Host Configuration Protocol (DHCP) server discovery mechanism. This is not specifically limited in this embodiment of this application.

With reference to the first aspect, in some implementations of the first aspect, the sixth message includes a quantity of service pointers that are applied for by the second service instance, and the communication method further includes: configuring the service pointer for the second service instance based on the quantity of service pointers that are applied for by the second service instance.

The sixth message carries the quantity of service pointers that are requested. In this way, the service instance requests, based on load of the service instance or other information, the service communication proxy to assign the service pointer, to ensure that a service related to the user equipment is managed at a proper granularity.

With reference to the first aspect, in some implementations of the first aspect, the communication method further includes: configuring the service pointer for the second service instance based on a capacity of the second service instance.

The sixth message carries the capacity of the service instance. In this way, the service communication proxy can configure the service pointer by comprehensively considering a capacity of another service instance in the service set to which the second service instance belongs, to ensure that binding and unbinding are performed at a proper granularity.

With reference to the first aspect, in some implementations of the first aspect, the communication method further includes: determining the service set to which the second service instance belongs; and configuring the service pointer for the second service instance, such that the service pointer corresponding to the second service instance is different from a service pointer corresponding to another service instance in the service set.

When the service pointer is assigned, the identifier of the service set to which the service instance belongs is also considered. Different service pointers are assigned to service instances in the same service set. This can avoid a conflict between service pointers in the service set. A same pointer is assigned to service instances in different service sets. This can avoid a conflict between service pointers in an entire network, and avoid a waste of service pointer resources.

With reference to the first aspect, in some implementations of the first aspect, the target identifier includes one of service pointers configured for the second service instance, and the communication method further includes: receiving a seventh message from the second service instance, where the seventh message includes a service pointer corresponding to the second service instance, such that the service communication proxy binds the second service instance to the service pointer.

In the foregoing technical solution, the service pointer in the seventh message may be a service pointer preconfigured for the second service instance. This can ensure that the service pointer is pre-assigned to or preconfigured for the second service instance based on a requirement of the second service instance.

With reference to the first aspect, in some implementations of the first aspect, the communication method further includes: when the service pointer corresponding to the second service instance conflicts with a service pointer corresponding to another service instance in the service set to which the second service instance belongs, reconfiguring a service pointer for the second service instance; and sending a seventh response message to the second service instance, where the seventh response message includes the service pointer reconfigured for the second service instance.

When the service pointer corresponding to the service instance conflicts with a service pointer corresponding to another service instance in the service set to which the service instance belongs, the service communication proxy re-assigns a service pointer to the service instance. This ensures uniqueness of a service pointer in the same service set.

With reference to the first aspect, in some implementations of the first aspect, when the first message is a Hypertext Transfer Protocol (HTTP) message, the target identifier is located in a header of the HTTP message.

The target identifier is located in the header of the HTTP message, to help the service communication proxy identify and process the target identifier.

It should be understood that the first message may be the HTTP message, an Advanced Message Queuing Protocol (AMQP) message, or a message in another format. The first message is not specifically limited in this embodiment of this application.

According to a second aspect, a communication method is provided. The communication method includes: sending, by a second service instance, a fourth message to a service communication proxy, where the fourth message is used to trigger the service communication proxy to establish a binding relationship between the second service instance and a target identifier, and the target identifier is related to a user equipment; and receiving, by the second service instance, a second message that is related to the user equipment and that is forwarded by the service communication proxy, where the second message includes the target identifier.

With reference to the second aspect, in some implementations of the second aspect, the fourth message is a message related to the user equipment, or the fourth message is a dedicated binding request.

With reference to the second aspect, in some implementations of the second aspect, the fourth message includes at least one of the target identifier or a binding timer.

It should be understood that a case in which the fourth message carries a binding indication may be understood as an explicit trigger. Certainly, the fourth message may alternatively not include the binding indication. This case may be understood as an implicit trigger.

A binding time for binding the service instance and the target identifier can be accurately controlled using the binding timer, such that another service instance can be selected after the binding timer expires. In this way, load balancing is better supported.

With reference to the second aspect, in some implementations of the second aspect, the communication method further includes: sending, by the second service instance, the target identifier to a first service instance.

With reference to the second aspect, in some implementations of the second aspect, the communication method further includes: inserting, by the service communication proxy, the target identifier in the fourth message to send the target identifier to the first service instance.

The first service instance may obtain the target identifier corresponding to the second service instance. In this way, the first service instance can add the target identifier to a message related to the user equipment during next message exchange, and sends the message related to the user equipment to the second service instance with which message exchange is previously performed. This ensures that a same service instance serves a same user equipment.

With reference to the second aspect, in some implementations of the second aspect, the communication method further includes: sending, by the second service instance, a fifth message to the service communication proxy, where the fifth message is used to request to release the binding relationship between the target identifier and the second service instance.

When the service instance does not need to process a message related to the user equipment, the service instance notifies, using an initiated unbinding request, the service communication proxy to release the binding relationship between the target identifier and the service instance. The service communication proxy maintains the binding relationship between the target identifier and the service instance. In comparison with other approaches in which a service instance directly maintains a binding relationship between service instances, the foregoing technical solution can further reduce complexity in processing of service instances.

It should be understood that the service instance may initiate the unbinding request when the service instance has relatively heavy load, goes offline, fails, or the like, to notify the service communication proxy to unbind the target identifier from the service instance. This ensures that a service related to the user equipment can be removed from the service instance in any one of the foregoing cases.

With reference to the second aspect, in some implementations of the second aspect, the fifth message further carries indication information, and the indication information is used to indicate the service communication proxy to bind the target identifier to a third service instance.

The fifth message carries the indication information, to indicate to unbind the target identifier from the original service instance and to bind the target identifier to another service instance. This completes service load transfer between the service instances, and implements load balancing between the service instances.

With reference to the second aspect, in some implementations of the second aspect, the target identifier is related to one user equipment or a group of user equipments.

Target identifiers at different granularities facilitate service management at different granularities.

With reference to the second aspect, in some implementations of the second aspect, the target identifier is one of service pointers configured for the second service instance, and the communication method further includes: sending, by the second service instance, a sixth message to the service communication proxy, where the sixth message is used to register the second service instance, and the sixth message includes a service pointer corresponding to the second service instance; and receiving, by the second service instance, a sixth response message sent by the service communication proxy, where the sixth response message includes the service pointer configured for the second service instance.

The service communication proxy is requested to preconfigure the service pointer for the service instance. This can implement automatic configuration of the service pointer.

With reference to the second aspect, in some implementations of the second aspect, the second service instance sends a registration request to the service communication proxy, where the registration request includes a quantity of service pointers that are applied for by the second service instance.

The registration request carries the quantity of service pointers that are requested. In this way, the service instance requests, based on load of the service instance or other information, the service communication proxy to assign the service pointer, to ensure that a service related to the user equipment is managed at a proper granularity. For example, when the service instance perceives that the service instance has relatively heavy load, the service instance may request the service communication proxy to assign a relatively large quantity of service pointers to the service instance, to perform management at a fine granularity. In this case, a quantity of user equipments corresponding to a single service pointer may be correspondingly decreased, to ensure that a service related to the user equipment is managed at a proper granularity.

With reference to the second aspect, in some implementations of the second aspect, the communication method further includes: sending, by the second service instance, a seventh message to the service communication proxy, where the seventh message includes a service pointer configured by the second service instance for the second service instance.

In the foregoing technical solution, the service pointer in the seventh message may be a service pointer manually preconfigured for the second service instance. This can ensure that the service pointer is pre-assigned to or preconfigured for the second service instance based on a requirement of the second service instance.

With reference to the second aspect, in some implementations of the second aspect, when the first message is a hypertext transfer protocol HTTP message, the target identifier is located in a header of the HTTP message.

The target identifier is located in the header of the HTTP message, to help the service communication proxy identify and process the target identifier.

It should be understood that the first message may be the HTTP message or an AMQP message. The first message is not specifically limited in this embodiment of this application.

According to a third aspect, a communication method is provided. The communication method includes: receiving, by a first service instance, a target identifier that is related to a user equipment and a second service instance; adding, by the first service instance, the target identifier to a message that is related to the user equipment and the second service instance; and sending the message, where the target identifier is used to send the message to the second service instance.

With reference to the third aspect, in some implementations of the third aspect, the first service instance receives the target identifier from the second service instance.

With reference to the third aspect, in some implementations of the third aspect, the first service instance receives the target identifier from a service communication proxy related to the second service instance.

According to a fourth aspect, a communications device is provided. The communications device is configured to perform the method according to any one of the first aspect or the possible implementations of the first aspect. For example, the device includes a unit configured to perform the method according to any one of the first aspect or the possible implementations of the first aspect.

According to a fifth aspect, another communications device is provided. The communications device is configured to perform the method according to any one of the second aspect or the possible implementations of the second aspect. For example, the device includes a unit configured to perform the method according to any one of the second aspect or the possible implementations of the second aspect.

According to a sixth aspect, another communications device is provided. The communications device is configured to perform the method according to any one of the third aspect or the possible implementations of the third aspect. For example, the device includes a unit configured to perform the method according to any one of the third aspect or the possible implementations of the third aspect.

According to a seventh aspect, a communications device is provided. The device includes a transceiver and a processor. The transceiver communicates with the processor through an internal connection path. The processor is configured to control a receiver to receive a signal and control a transmitter to send a signal. Optionally, the communications device further includes a memory. The transceiver, the memory, and the processor communicate with each other through an internal connection path. The memory is configured to store an instruction. The processor is configured to execute the instruction stored in the memory, to control the receiver to receive a signal and control the transmitter to send a signal, to enable the device to perform the method according to any one of the first aspect or the possible implementations of the first aspect.

According to an eighth aspect, another communications device is provided. The device includes a transceiver. The transceiver is configured to receive/send a signal. Optionally, the communications device further includes a processor. The transceiver and the processor communicate with each other through an internal connection. The processor is configured to execute an instruction, to control a receiver to receive a signal and control a transmitter to send a signal. Optionally, the communications device further includes a memory. The transceiver, the memory, and the processor communicate with each other through an internal connection path. The memory is configured to store an instruction. The processor is configured to execute the instruction stored in the memory, to control the receiver to receive a signal and control the transmitter to send a signal, to enable the device to perform the method according to any one of the second aspect or the possible implementations of the second aspect.

According to a ninth aspect, another communications device is provided. The device includes a transceiver and a processor. The transceiver is configured to receive/send a signal. Optionally, the communications device further includes a processor. The transceiver and the processor communicate with each other through an internal connection. The processor is configured to execute an instruction, to control a receiver to receive a signal and control a transmitter to send a signal. Optionally, the communications device further includes a memory. The transceiver, the memory, and the processor communicate with each other through an internal connection path. The memory is configured to store an instruction. The processor is configured to execute the instruction stored in the memory, to control the receiver to receive a signal and control the transmitter to send a signal, to enable the device to perform the method according to any one of the third aspect or the possible implementations of the third aspect.

According to a tenth aspect, an embodiment of this application provides a communications system. The communications system includes one or more of a service communication proxy or a service instance.

The service communication proxy is configured to perform the method according to any one of the first aspect or the possible implementations of the first aspect, or a method performed by the service communication proxy in the solutions provided in the embodiments of this application. The service instance is configured to perform the method according to any one of the second aspect or the possible implementations of the second aspect, the method according to any one of the third aspect or the possible implementations of the third aspect, or a method performed by the service instance in the solutions provided in the embodiments of this application.

In a possible implementation, the system further includes another device, for example, an access network element and/or a data network (DN) network element, that interacts with either of the service communication proxy and the service instance in the solutions provided in the embodiments of this application.

According to an eleventh aspect, a communication method is provided. The communication method includes: receiving, by a first service instance, a first message that is related to a first session and that is sent by a third service instance or a fourth service instance, where the first message includes a target identifier; determining, by the first service instance based on the target identifier, a second service instance that is to provide a service for the first session; and sending, by the first service instance, a second message related to the first session to the second service instance.

The first service instance determines, based on the target identifier, the service instance that is to provide a service for the first session. This improves flexibility of selecting the service instance, such that the selected service instance that is to provide a service for the first session subsequently may be different from a service instance that previously provides a service for the first session, to avoid interruption caused to the first session because the third service instance fails.

With reference to the eleventh aspect, in some implementations of the eleventh aspect, the first message includes binding manner indication information, the binding manner indication information is used to indicate to bind the first session to the third service instance or bind the first session to a target service set, and the target service set includes the second service instance and the third service instance.

The first service instance may determine, based on the binding manner indication information, a manner of selecting the service instance.

With reference to the eleventh aspect, in some implementations of the eleventh aspect, the target identifier includes an identifier of the third service instance.

With reference to the eleventh aspect, in some implementations of the eleventh aspect, the method further includes: receiving, by the first service instance, a third message sent by the third service instance, where the third message includes backup indication information, the backup indication information is used to indicate the second service instance to provide a backup for the third service instance or indicate the second service instance to provide a backup for a first session group for which the third service instance provides a service, and the first session group includes the first session. Additionally, the determining, by the first service instance based on the target identifier, a second service instance that is to provide a service for the first session includes: when the third service instance is unavailable, determining, by the first service instance, the second service instance based on the backup indication information and the target identifier.

Based on the backup indication information, the first service instance may use the service instance that provides a backup for the first session group as a candidate service instance. When the third service instance to which the first session is bound is unavailable, a backup service instance is to provide a service for the first session. This can avoid interruption caused to the first session because the third service instance fails, and improve user experience.

With reference to the eleventh aspect, in some implementations of the eleventh aspect, the determining, by the first service instance based on the target identifier, a second service instance that is to provide a service for the first session includes: obtaining, by the first service instance, an identifier of the target service set based on the target identifier; and determining, by the first service instance, the second service instance from the target service set based on the identifier of the target service set, where the target service set includes the second service instance, the third service instance, and the fourth service instance.

The first service instance determines, based on the identifier of the target service set, the service instance that is to provide a service for the first session. This improves flexibility of selecting the service instance, such that the selected service instance that is to provide a service for the first session subsequently may be the same as or different from a service instance that previously provides a service for the first session, to avoid interruption caused to the first session because the service instance is unavailable.

With reference to the eleventh aspect, in some implementations of the eleventh aspect, the determining, by the first service instance, the second service instance from the target service set based on the identifier of the target service set includes: sending, by the first service instance, the identifier of the target service set to a network storage function (e.g., a network repository function (NRF) network element), and receiving, by the first service instance, an identifier of the second service instance that is sent by the NRF network element, to determine the second service instance.

The first service instance determines, based on the identifier of the service instance that is sent by the NRF network element, that the service instance is to provide a service for the first session. This can lower a requirement for a storage capability and a processing capability of the first service instance.

With reference to the eleventh aspect, in some implementations of the eleventh aspect, the method includes: receiving, by the first service instance, first information sent by a service instance in the target service set, where the first information includes an identifier of the service instance and the identifier of the target service set. Additionally, the determining, by the first service instance, the second service instance from the target service set based on the identifier of the target service set includes: determining, by the first service instance, the second service instance based on the identifier of the target service set and the first information.

The first service instance according to the received identifier of target service set and one or more identifiers of one or more service instances included in the target service set, to determine the service instance that is to provide a service for the first session. This can reduce dependence of the first service instance on another network element in a system, and reduce a system delay, and there is no need to deploy an additional network element such as a domain name resolution server (DNS) or an NRF.

With reference to the eleventh aspect, in some implementations of the eleventh aspect, the obtaining, by the first service instance, an identifier of the target service set based on the target identifier includes: obtaining, by the first service instance, the identifier of the target service set from the target identifier, where the target identifier includes the identifier of the target service set; or when the target identifier includes the identifier of the third service instance, obtaining, by the first service instance, the identifier of the target service set based on the identifier of the third service instance, where the target service set includes the third service instance.

With reference to the eleventh aspect, in some implementations of the eleventh aspect, the target identifier includes an identifier of the first session group, and the first session group includes the first session. Additionally, the determining, by the first service instance based on the target identifier, a second service instance that is to provide a service for the first session includes: sending, by the first service instance, the identifier of the first session group to the NRF network element; and receiving, by the first service instance, the identifier of the second service instance that is sent by the NRF network element, to determine the second service instance.

The first service instance determines, based on the session group to which the first session belongs, the service instance that is to provide a service for the first session. This can avoid a status error caused to the first session because a service instance that is randomly selected by the first service instance from the target service set is different from a service instance selected by another network element such as an access management function (AMF) network element in a system.

With reference to the eleventh aspect, in some implementations of the eleventh aspect, the first service instance is a user plane function (UPF) network element, and the second service instance, the third service instance, and the fourth service instance are session management function (SMF) network elements.

According to a twelfth aspect, a communications device is provided. The communications device includes a processor and a communications interface. The communications interface is configured to receive a first message that is related to a first session and that is sent by a third service instance or a fourth service instance, where the first message includes a target identifier. The processor is configured to determine, based on the target identifier, a second service instance that is to provide a service for the first session. The communications interface is further configured to send a second message related to the first session to the second service instance.

The communications device determines, based on the target identifier, the service instance that is to provide a service for the first session. This improves flexibility of selecting the service instance, such that the selected service instance that is to provide a service for the first session subsequently may be different from a service instance that previously provides a service for the first session, to avoid interruption caused to the first session because the third service instance fails.

With reference to the twelfth aspect, in some implementations of the twelfth aspect, the first message includes binding manner indication information, the binding manner indication information is used to indicate to bind the first session to the third service instance or bind the first session to a target service set, and the target service set includes the second service instance and the third service instance.

The communications device may determine, based on the binding manner indication information, a manner of selecting the service instance.

With reference to the twelfth aspect, in some implementations of the twelfth aspect, the target identifier includes an identifier of the third service instance.

With reference to the twelfth aspect, in some implementations of the twelfth aspect, the communications interface is further configured to receive a third message sent by the third service instance, where the third message includes backup indication information, the backup indication information is used to indicate the second service instance to provide a backup for the third service instance or indicate the second service instance to provide a backup for a first session group for which the third service instance provides a service, and the first session group includes the first session. When the third service instance is unavailable, the processor is configured to determine the second service instance based on the backup indication information and the target identifier.

Based on the backup indication information, the communications device may use the service instance that provides a backup for the first session group as a candidate service instance. When the third service instance to which the first session is bound is unavailable, a backup service instance is to provide a service for the first session. This can avoid interruption caused to the first session because the third service instance fails, and improve user experience.

With reference to the twelfth aspect, in some implementations of the twelfth aspect, the processor is further configured to obtain an identifier of the target service set based on the target identifier. The processor is further configured to determine the second service instance from the target service set based on the identifier of the target service set, where the target service set includes the second service instance, the third service instance, and the fourth service instance.

The communications device determines, based on the identifier of the target service set, the service instance that is to provide a service for the first session. This improves flexibility of selecting the service instance, such that the selected service instance that is to provide a service for the first session subsequently may be the same as or different from a service instance that previously provides a service for the first session, to avoid interruption caused to the first session because the service instance is unavailable.

With reference to the twelfth aspect, in some implementations of the twelfth aspect, the communications interface is further configured to send the identifier of the target service set to a NRF network element. The communications interface is further configured to receive an identifier of the second service instance that is sent by the NRF network element, to determine the second service instance.

The communications device determines, based on the identifier of the service instance that is sent by the NRF network element, that the service instance is to provide a service for the first session. This can lower a requirement for a storage capability and a processing capability of the first service instance.

With reference to the twelfth aspect, in some implementations of the twelfth aspect, the communications interface is further configured to receive first information sent by a service instance in the target service set, where the first information includes an identifier of the service instance and the identifier of the target service set. The processor is configured to determine the second service instance based on the target identifier and the first information.

The communications device receives the target service set and one or more identifiers of one or more service instances included in the target service set, to determine the service instance that is to provide a service for the first session. This can reduce dependence on another network element in a system, and reduce a system delay, and there is no need to deploy an additional network element such as a domain name resolution server (DNS) or an NRF.

With reference to the twelfth aspect, in some implementations of the twelfth aspect, the processor is further configured to obtain the identifier of the target service set from the target identifier, where the target identifier includes the identifier of the target service set; or when the target identifier includes the identifier of the third service instance, the processor is further configured to obtain the identifier of the target service set based on the identifier of the third service instance, where the target service set includes the third service instance.

With reference to the twelfth aspect, in some implementations of the twelfth aspect, the target identifier includes an identifier of the first session group, and the first session group includes the first session. The communications interface is further configured to send the identifier of the first session group to the NRF network element. The communications interface is further configured to receive the identifier of the second service instance that is sent by the NRF network element, to determine the second service instance.

The communications device determines, based on the session group to which the first session belongs, the service instance that is to provide a service for the first session. This can avoid a status error caused to the first session because a service instance that is randomly selected by the communications device from the target service set is different from a service instance selected by another network element such as an AMF network element in a system.

With reference to the twelfth aspect, in some implementations of the twelfth aspect, the communications device is a UPF network element, and the second service instance, the third service instance, and the fourth service instance are SMF network elements.

According to a thirteenth aspect, a communications device is provided. The communications device includes a transceiver unit and a determining unit. The transceiver unit is configured to receive a first message that is related to a first session and that is sent by a third service instance or a fourth service instance, where the first message includes a target identifier. The determining unit is configured to determine, based on the target identifier, a second service instance that is to provide a service for the first session. The transceiver unit is further configured to send a second message related to the first session to the second service instance.

With reference to the thirteenth aspect, in some implementations of the thirteenth aspect, the first message includes binding manner indication information, the binding manner indication information is used to indicate to bind the first session to the third service instance or bind the first session to a target service set, and the target service set includes the second service instance, the third service instance, and the fourth service instance.

With reference to the thirteenth aspect, in some implementations of the thirteenth aspect, the target identifier includes an identifier of the third service instance.

With reference to the thirteenth aspect, in some implementations of the thirteenth aspect, the transceiver unit is further configured to receive a third message sent by the third service instance, where the third message includes backup indication information, the backup indication information is used to indicate the second service instance to provide a backup for the third service instance or indicate the second service instance to provide a backup for a first session group for which the third service instance provides a service, and the first session group includes the first session. When the third service instance is unavailable, the determining unit is configured to determine the second service instance based on the backup indication information and the target identifier.

With reference to the thirteenth aspect, in some implementations of the thirteenth aspect, the communications device further includes an obtaining unit. The obtaining unit is configured to obtain an identifier of the target service set based on the target identifier. The determining unit is configured to determine the second service instance from the target service set based on the identifier of the target service set, where the target service set includes the second service instance, the third service instance, and the fourth service instance.

With reference to the thirteenth aspect, in some implementations of the thirteenth aspect, the transceiver unit is further configured to send the identifier of the target service set to an NRF network element. The transceiver unit is further configured to receive an identifier of the second service instance that is sent by the NRF network element, to determine the second service instance.

With reference to the thirteenth aspect, in some implementations of the thirteenth aspect, the transceiver unit is further configured to receive first information sent by a service instance in the target service set, where the first information includes an identifier of the service instance and the identifier of the target service set. The determining unit is configured to determine the second service instance based on the identifier of the target service set and the first information.

With reference to the thirteenth aspect, in some implementations of the thirteenth aspect, the obtaining unit is configured to obtain the identifier of the target service set from the target identifier, where the target identifier includes the identifier of the target service set.

With reference to the thirteenth aspect, in some implementations of the thirteenth aspect, when the target identifier includes the identifier of the third service instance, the obtaining unit is configured to obtain the identifier of the target service set based on the identifier of the third service instance, where the target service set includes the third service instance.

With reference to the thirteenth aspect, in some implementations of the thirteenth aspect, the target identifier includes an identifier of the first session group, and the first session group includes the first session. The transceiver unit is further configured to send the identifier of the first session group to the NRF network element. The transceiver unit is further configured to receive the identifier of the second service instance that is sent by the NRF network element, to determine the second service instance.

With reference to the thirteenth aspect, in some implementations of the thirteenth aspect, the communications device is a UPF network element, and the second service instance, the third service instance, and the fourth service instance are SMF network elements.

According to a fourteenth aspect, a communication method is provided. The communication method includes: sending, by a third service instance, a first message related to a first session to a first service instance, where the first message includes a target identifier, the target identifier is used to indicate the first service instance to determine a second service instance, and the second service instance is used to provide a service for the first session.

With reference to the fourteenth aspect, in a possible implementation, the first message includes binding manner indication information, the binding manner indication information is used to indicate to bind the first session to the third service instance or bind the first session to a target service set, and the target service set includes the second service instance and the third service instance.

With reference to the fourteenth aspect, in a possible implementation, the target identifier includes an identifier of the third service instance.

With reference to the fourteenth aspect, in a possible implementation, the third service instance receives capability indication information sent by the first service instance or an NRF network element, where the capability indication information is used to indicate that the first service instance supports load balancing that is based on a target service set, and the target service set includes the second service instance and the third service instance.

With reference to the fourteenth aspect, in a possible implementation, the third service instance sends an identifier of the target service set and an identifier of the third service instance to the first service instance, where the target service set includes the second service instance and the third service instance.

With reference to the fourteenth aspect, in a possible implementation, the third service instance sends backup indication information to the first service instance, where the backup indication information is used to indicate the second service instance to provide a backup for the third service instance or provide a backup for a first session group for which the second service instance provides a service, and the first session group includes the first session.

According to a fifteenth aspect, a communications device is provided. The communications device is configured to perform the method according to any one of the fourteenth aspect or the possible implementations of the fourteenth aspect. For example, the device includes a unit configured to perform the method according to any one of the fourteenth aspect or the possible implementations of the fourteenth aspect.

According to a sixteenth aspect, a communications device is provided. The device includes a transceiver and a processor. The transceiver communicates with the processor through an internal connection path. The processor is configured to control a receiver to receive a signal and control a transmitter to send a signal. Optionally, the communications device further includes a memory. The transceiver, the memory, and the processor communicate with each other through an internal connection path. The memory is configured to store an instruction. The processor is configured to execute the instruction stored in the memory, to control the receiver to receive a signal and control the transmitter to send a signal, to enable the device to perform the method according to any one of the fourteenth aspect or the possible implementations of the fourteenth aspect.

According to a seventeenth aspect, a communications system is provided. The communications system includes a first service instance. The first service instance is configured to perform the method according to any one of the eleventh aspect or the possible implementations of the eleventh aspect, or a method performed by the first service instance in the solutions provided in the embodiments of this application.

With reference to the seventeenth aspect, in a possible implementation, the system may further include a third service instance. The third service instance is configured to perform the method according to any one of the fourteenth aspect or the possible implementations of the fourteenth aspect, or a method performed by the third service instance in the solutions provided in the embodiments of this application.

With reference to the seventeenth aspect, in a possible implementation, the system may further include another device such as an access management function network element that interacts with the first service instance and/or the third service instance in the eleventh aspect and the fourteenth aspect. The access management function network element may be configured to perform a method performed by an access management function network element in the solutions provided in the embodiments of this application.

According to an eighteenth aspect, a computer program product is provided. The computer program product includes computer program code. When the computer program code is run by a computer, the computer is enabled to perform the method in any possible implementation of any one of the foregoing aspects.

According to a nineteenth aspect, a computer-readable medium is provided. The computer-readable medium is configured to store a computer program. The computer program includes an instruction used to perform the method in any possible implementation of any one of the foregoing aspects.

According to a twentieth aspect, a communications chip is provided. The communications chip stores an instruction. When the instruction is run on a computer device, the communications chip is enabled to perform the method in any possible implementation of any one of the foregoing aspects.

DESCRIPTION OF EMBODIMENTS

Technical solutions provided in the embodiments of this application may be applied to various service-based communications architectures.

Figure 1:
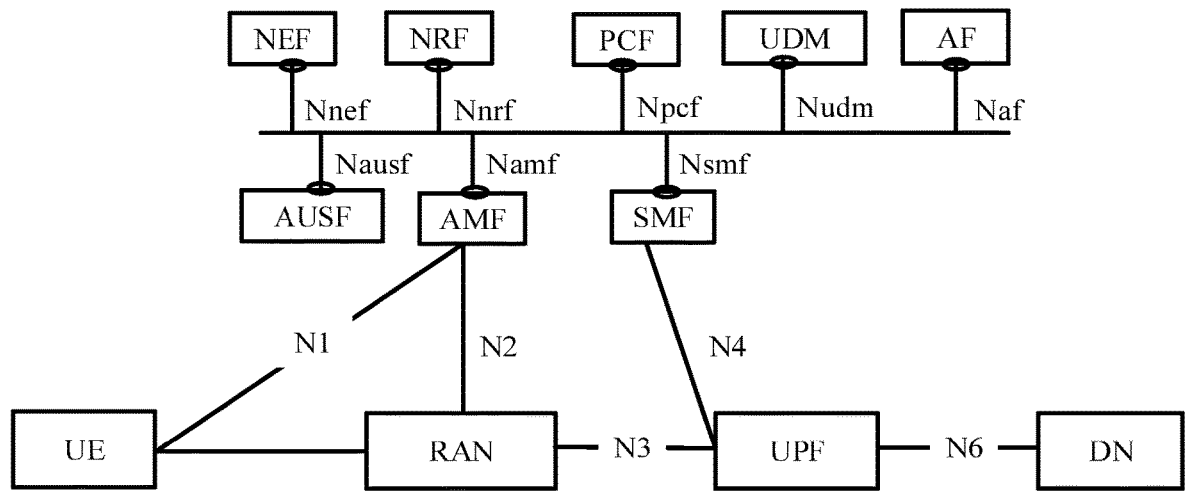
FIG. 1 is a schematic architectural diagram of a 5G system according to an embodiment of this application.

For ease of understanding, the following briefly describes, using a 5G communications system as an example, a service-based architecture and a communication mode of the service-based architecture with reference to FIG. 1. As shown in FIG. 1, a service-based network architecture 100 provided in an embodiment of this application includes a plurality of network functions (NFs).

1. Session management network element: The session management network element is mainly configured to: manage a session, assign and manage an Internet Protocol (IP) address of a terminal device, select an endpoint that can manage a user equipment plane function interface and a policy control and charging function interface, perform downlink data notification, and the like. In 5G communication, the session management network element may be a session management function (SMF) network element. In future communication such as $6^{th}$ generation (6G) communication, the session management network element may still be an SMF network element or have another name. This is not limited in this application. Nsmf is a service-based interface provided by the SMF. The SMF may communicate with another network function through the Nsmf.

2. Access management network element: The access management network element is mainly configured to perform mobility management, access management, and the like. The access management network element may be configured to implement a function, for example, lawful interception or access authorization (or authentication), in mobility management entity (MME) functions other than session management. In 5G communication, the access management network element may be an access and mobility management function (AMF) network element. In future communication such as 6G communication, the access management network element may still be an AMF network element or have another name. This is not limited in this application. Namf is a service-based interface provided by the AMF. The AMF may communicate with another network function through the Namf.

3. Authentication service network element: The authentication service network element is mainly configured to perform user authentication and the like. In 5G communication, the authentication service network element may be an authentication server function (AUSF) network element. In future communication such as 6G communication, the authentication service network element may still be an AUSF network element or have another name. This is not limited in this application. Nausf is a service-based interface provided by the AUSF. The AUSF may communicate with another network function through the Nausf.

4. Network exposure network element: The network exposure network element is configured to securely expose, to the outside, a service, a capability, and the like that are provided by a 3rd Generation Partnership Project (3GPP) network function. In 5G communication, the network exposure network element may be a network exposure function (NEF) network element. In future communication such as 6G communication, the network exposure network element may still be an NEF network element or have another name. This is not limited in this application. Nnef is a service-based interface provided by the NEF. The NEF may communicate with another network function through the Nnef.

5. Network repository network element: The network repository network element is configured to store description information of a network function entity and description information of a service provided by the network function entity, and support service discovery, network element entity discovery, and the like. In 5G communication, the network repository network element may be a network repository function (NRF) network element. In future communication such as 6G communication, the network repository network element may still be an NEF network element or have another name. This is not limited in this application. Nnrf is a service-based interface provided by the NRF. The NRF may communicate with another network function through the Nnrf.

6. Policy control network element: The policy control network element is configured to guide a unified policy framework for network behavior, provide policy rule information for a control plane function network element (such as an AMF or an SMF), and the like. In 5G communication, the policy control network element may be a policy control function (PCF) network element. In future communication such as 6G communication, the policy control network element may still be a PCF network element or have another name. This is not limited in this application. Npcf is a service-based interface provided by the PCF. The PCF may communicate with another network function through the Npcf.

7. Data management network element: The data management network element is configured to perform user identification handling, access authentication, registration management or mobility management, and the like. In 5G communication, the data management network element may be a unified data management (UDM) network element. In future communication such as 6G communication, the data management network element may still be a UDM network element or have another name. This is not limited in this application. Nudm is a service-based interface provided by the UDM. The UDM may communicate with another network function through the Nudm.

8. Application network element: The application network element is configured to perform application-affected data routing, access a network exposure function, interact with a policy framework to perform policy control, or the like. In 5G communication, the application network element may be an application function (AF) network element. In future communication such as 6G communication, the application network element may still be an AF network element or have another name. This is not limited in this application. Naf is a service-based interface provided by the AF. The AF may communicate with another network function through the Naf.

9. User equipment (UE): The user equipment may include various handheld devices, vehicle-mounted devices, wearable devices, or computing devices that have a wireless communication function, or another processing device connected to a wireless modem, and terminals in various forms such as mobile stations (MS), terminals, UEs, and soft terminals, for example, a water meter, an electricity meter, and a sensor.

10. (Radio) access network ((R)AN) network element: The (R)AN network element is configured to provide a network access function for an authorized user equipment in a specific area, and can use transmission tunnels with different quality based on user equipment levels, service requirements, and the like.

The RAN network element can manage radio resources and provide an access service for a terminal device, to forward a control signal and user equipment data between the terminal and a core network. The RAN network element may also be understood as a base station in a conventional network.

11. User plane (e.g., user plane function (UPF)) network element: The user plane network element is configured to perform packet routing and forwarding, perform quality of service (QoS) processing on user plane data, and the like. In 5G communication, the user plane network element may be a UPF network element. In future communication such as 6G communication, the user plane network element may still be a UPF network element or have another name. This is not limited in this application.

12. Data network (DN) network element: The DN network element is configured to provide a network for transmitting data, for example, an internet network. The DN network element may be a data network authentication, authorization, and accounting (data network authentication, authorization, accounting) network element, an application server (application function), or the like.

It may be understood that the foregoing functions or network elements may be network elements in a hardware device, software functions running on dedicated hardware, or virtualized functions instantiated on a platform (for example, a cloud platform).

An N1 interface in FIG. 1 is a reference point between the UE and the AMF. An N2 interface is a reference point between the RAN and the AMF, and is used to send a non-access stratum (NAS) message and a next generation application protocol NGAP) message, and the like. An N3 interface is a reference point between the RAN and the UPF, and is used to transmit user plane data and the like. An N4 interface is a reference point between the SMF and the UPF, and is used to transmit information such as tunnel identifier information of an N3 connection, data buffering indication information, and a downlink data notification message. An N6 interface is a reference point between the UPF and the DN, and is configured to transmit user plane data and the like.

It should be understood that the network architecture 100 is merely a network architecture described from a perspective of a service-based architecture. An application scenario is not limited in the embodiments of this application, and any network architecture that can implement the foregoing network functions is applicable to the embodiments of this application.

Generally, in a process of providing a service for a user, a plurality of service instances are required to exchange messages related to the user. A service instance provided in the embodiments of this application may be a network function in FIG. 1, for example, may be the session management network element, the access management network element, or the policy control network element. For ease of description, that an access management network element is an AMF, a session management network element is an SMF, and a policy control network element is a PCF is used as an example for subsequent descriptions in this application. In other words, in the subsequent descriptions in this application, a UPF network element may be replaced with a user plane network element, and an SMF network element may be replaced with a session management network element.

For example, a producer service instance is an AMF. The AMF sends a message related to the user equipment to a service framework (where the service framework may include the NRF in FIG. 1, or may include another network function). After receiving the message related to the user equipment, the service framework selects one service instance from a plurality of consumer service instances that can provide a same function. For example, the service framework selects one SMF from a plurality of SMFs, and sends the message related to the user equipment to the SMF. In this way, the producer service instance and the consumer service instance complete exchange of the message related to the user equipment.

In some scenarios, a same service instance is required to serve a same user equipment. To achieve the foregoing objective, in other approaches, two service instances that are communicating with each other are directly bound to each other. For example, two service instances, an AMF and an SMF, are processing a session management procedure related to a user equipment. The AMF and the SMF notify each other to subsequently send a message related to the user equipment to each other, to implement binding between the two service instances. However, the binding implemented using the foregoing method increases complexity in processing of the service instances, and this is problematic, especially in a concurrent scenario. For example, the AMF and a plurality of SMFs are performing a plurality of procedures related to the user equipment. The AMF and a first SMF are performing a session-related procedure related to the user equipment, and the AMF and a second SMF are performing a mobility-related procedure related to the user equipment. When the session procedure between the first SMF and the AMF ends, the first SMF is unbound from the AMF, and determines not to send a message related to the user equipment to the AMF any longer subsequently. However, in this case, the procedure between the AMF and the second SMF does not end yet. Therefore, the AMF temporarily does not release a context of the user equipment. In this case, if the first SMF initiates a session-related procedure again, because the AMF does not release the context yet, the first SMF may send a message to another AMF. Consequently, message redirection needs to be performed, such that the message is finally sent to the original AMF. In this case, interaction between the service instances is complex.

Figure 2:
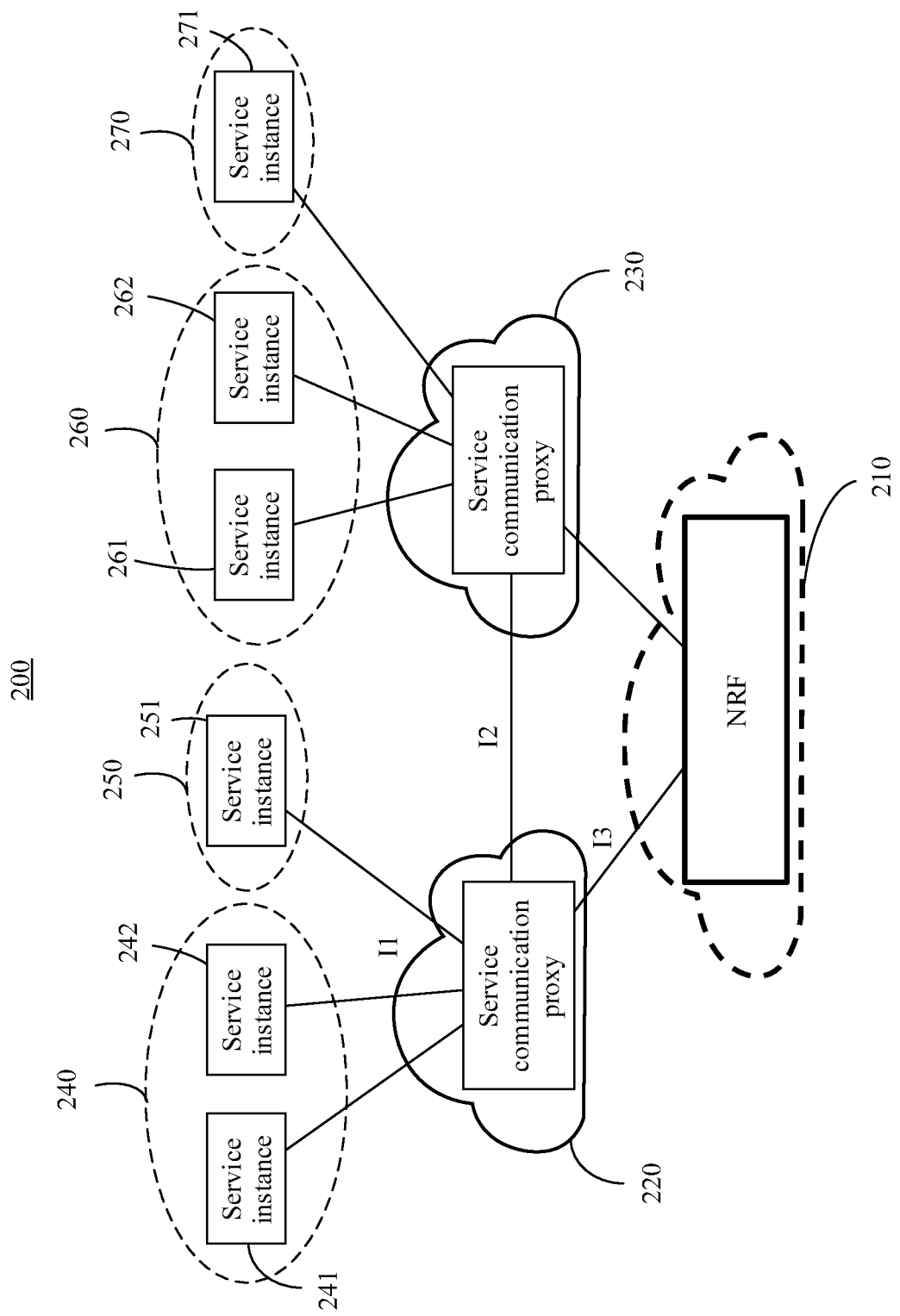
FIG. 2 is a schematic diagram of a service framework according to an embodiment of this application.

An embodiment of this application provides a method that can reduce complexity in processing of service instances. For ease of understanding, the following first describes a schematic diagram of a service framework applied to the embodiments of this application. FIG. 2 is a schematic diagram of a service framework according to an embodiment of this application.

The service framework shown in FIG. 2 includes an NRF 210, a service communication proxy 220, a service communication proxy 230, and a service set 240 to a service set 270.

In FIG. 2, service instances in a same service set may provide a same function, and service instances in different service sets may provide a same function or different functions. For example, a service instance 241 and a service instance 242 in the service set 240 shown in FIG. 2 may provide a same function. For example, both the service instance 241 and the service instance 242 may be SMFs or AMFs. In an example, both the service set 240 and a service set 250 may be sets including SMFs, and both a service set 260 and the service set 270 may be sets including AMFs. A service set may have an identifier of the service set. For example, the identifier may be an FQDN, an IP address, an ID of the service set, or another customized identifier. A type of the identifier of the service set is not specifically limited in this embodiment of this application. Each service instance in the service set may have a target identifier. The target identifier may have different formats. For example, when the target identifier is related to one user equipment, the target identifier may be at least one of an IP address or a port number of a service communication proxy. Alternatively, the target identifier may include an identifier of a service set to which second service instance belongs and a unique identifier in the service set. Alternatively, the target identifier is a value that is assigned by a service communication proxy and that is unique on the service communication proxy. This is not limited in this application. When the target identifier is related to a group of user equipments, the target identifier may be an identifier of a service set corresponding to a second service instance, or include an identifier of the service set and an identifier of a second service instance or an identifier of the service set and a unique service pointer in the service set, where the service pointer is used to identify the group of user equipments served by the service set, and so on. This is not limited in this application.

There may be a communications interface between a service communication proxy and a service instance. For ease of understanding, the following describes a function of the communications interface with reference to an example. As shown in FIG. 2, the service communication proxy 220 may exchange a message with a service instance in the service set 240 through an I1 interface. For example, when a message received by the service communication proxy 220 includes an identifier of a target service set, the service communication proxy 220 determines, based on the identifier that is of the target service set and that is in the message, whether there is a direct interface between the service communication proxy 220 and the target service set. Assuming that the identifier that is of the target service set and that is in the message is an identifier of the service set 240, the service communication proxy 220 determines whether there is a direct interface between the service communication proxy 220 and the target service set 240. Because there is a direct interface between the service communication proxy 220 and the target service set 240, the service communication proxy may select a target service instance from the service set 240, and send the message to the target service instance.

It should be understood that the foregoing message exchange procedure between the service communication proxy and the service instance is merely an example and should not constitute a limitation on the embodiments of this application.

There may also be an interface between service communication proxies, such that the service communication proxies can also exchange a message. For example, the service communication proxy 230 and the service communication proxy 220 may exchange a message through an interface 12. When there is no direct interface between a service communication proxy and a target service instance, a message may be forwarded to the target service instance through an interface between service communication proxies.

It should be understood that the service communication proxy provided in this embodiment of this application may be a network function newly defined in the service framework. For example, the service communication proxy may be an HTTP reverse proxy. In some deployment modes, for convenience of information exchange, a service communication proxy may alternatively be deployed in a same data center as a service instance that has an interface with the service communication proxy. Certainly, a service communication proxy and a service instance that has an interface with the service communication proxy may alternatively be deployed in different data centers. This is not specifically limited in this embodiment of this application. To support remote disaster recovery, a service set may be deployed across a plurality of data centers, to be more specific, a plurality of service instances in the service set may be deployed in different data centers. In this case, one service communication proxy instance may be deployed in each data center in which the service set is deployed, and service communication proxy instances deployed in the plurality of data centers constitute the foregoing service communication proxy.

It should be understood that the service communication proxy provided in this embodiment of this application may further support functions of registration and discovery of a local service instance. When a service instance is registered, the service communication proxy may bind the service instance to a target identifier.

The service framework provided in this embodiment of this application may further include the NRF 210. The service communication proxy may sometimes register information about a service set and a service instance with the NRF 210. The NRF 210 may communicate with the service communication proxy through an I3 interface. When the service communication proxy constituted by the service communication proxy instances deployed in the plurality of data centers, the service communication proxy registers address information of the plurality of service communication proxy instances with the NRF 210, such that the NRF 210 can select different service communication proxy instances for different user equipments. This supports load sharing by a service set in different data centers, and avoids a data path detour caused by data forwarding by a same service communication proxy.

It should be understood that the service framework shown in FIG. 2 is merely an example, and the service framework may have many structural variations. For example, the service framework may include only the service communication proxy. In this case, the service communication proxy may integrate functions of the NRF and the service communication proxy in FIG. 2. Alternatively, the service framework may include only the service instance and the NRF. In this case, the NRF integrates functions of the NRF and the service communication proxy in FIG. 2.

In addition, the function that is of the service communication proxy and that is responsible for registration and discovery of a service instance and the function that is of the service communication proxy and that is responsible for message forwarding may be two independent entities.

Figure 3:
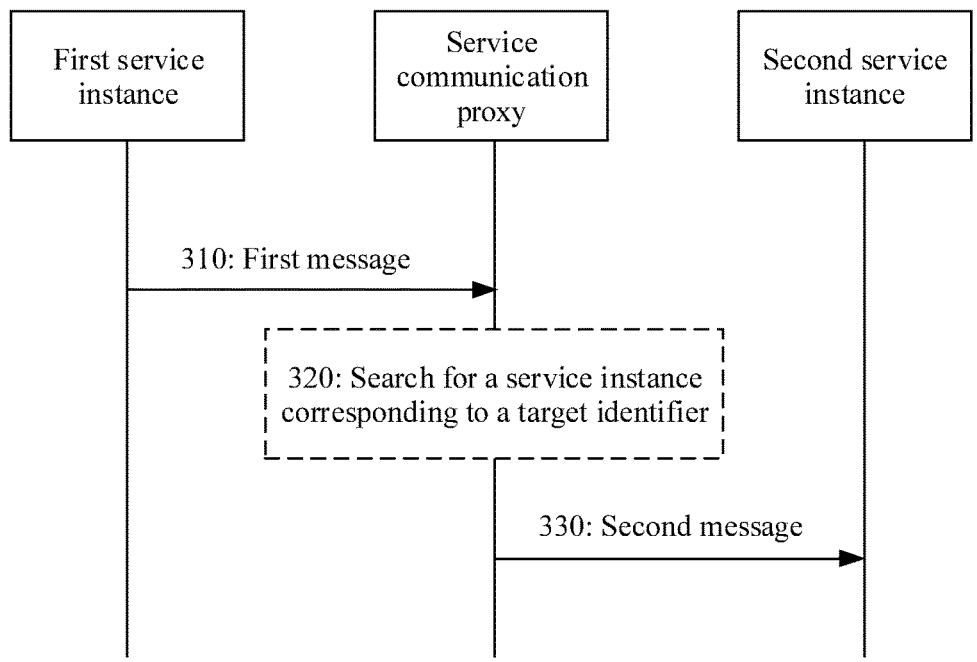
FIG. 3 is a schematic diagram of a communication method according to an embodiment of this application.

With reference to FIG. 3, the following describes a communication method according to an embodiment of this application.

The communication method shown in FIG. 3 includes steps 310 and 330. The following describes each step in FIG. 3 in detail.

Step 310: Receive a first message sent by a first service instance, where the first message includes a target identifier.

The service instance provided in this embodiment of this application may be a network function in FIG. 1, for example, may be an AMF, an SMF, or a PCF. Alternatively, the service instance may be one of a plurality of service instances obtained through division from a network function. With development of technologies, the service instance may alternatively exist independent of a network function. This is not specifically limited in this embodiment of this application.

The first message may be a message that is related to a user equipment and that is sent by the first service instance. In an example, when the first service instance is an AMF or an SMF, the first message may be a message in a session-related procedure, a message in a mobility-related procedure, or the like.

The first message carries the target identifier. The target identifier may have different formats. For example, when the target identifier is related to one user equipment, the target identifier may be at least one of an IP address or a port number of a service communication proxy. Alternatively, the target identifier may include an identifier of a service set to which the second service instance belongs and a unique identifier in the service set. Alternatively, the target identifier is a value that is assigned by a service communication proxy and that is unique on the service communication proxy. This is not limited in this application. When the target identifier is related to a group of user equipments, the target identifier may be an identifier of a service set corresponding to the second service instance, or include an identifier of the service set and an identifier of the second service instance or an identifier of the service set and a unique service pointer in the service set, where the service pointer is used to identify the group of user equipments served by the service set, and so on. This is not limited in this application.

In an example, a network element that receives the first message in step 310 may be a service communication proxy in a service framework, or certainly may be another network element that can provide a service communication proxy function. This is not specifically limited in this embodiment of this application.

Optionally, before step 310, the first service instance may further receive the target identifier related to the user equipment, such that the first message carries the target identifier before or when step 310 is performed. In an example, when the first service instance is an SMF, the SMF may receive, before sending the first message, the target identifier sent by an AMF. In an example, the SMF may obtain, in a session establishment procedure between the SMF and the AMF, the target identifier sent by the AMF, and store the target identifier in a context of the user equipment. In this way, when the SMF needs to send a message to the AMF subsequently, the SMF may obtain the target identifier related to the user equipment from the context of the user equipment, and add the target identifier to the first message.

From a perspective of a message type, the first message may be an HTTP message, an AMQP message, or the like. This is not specifically limited in this embodiment of this application.

Step 330: A service communication proxy sends, based on the first message, a second message to the second service instance that has a binding relationship with the target identifier.

The target identifier and the second service instance may have the binding relationship. In other words, the corresponding service instance may be found based on the target identifier. In an example, when the target identifier is a service pointer, a target service instance may be found based on a correspondence between the service pointer and the service instance.

When the first message is the HTTP message, the target identifier may be located in a header of the HTTP message, to help the service communication proxy identify and process the target identifier. In this embodiment of this application, a new optional HTTP header that is called a target identifier may be added. Herein, that the new header is called the target identifier is merely used as an example, and a specific name of the newly defined HTTP header is not specifically specified in this embodiment. The target identifier may alternatively be located in a network tag field (Cookie) in the HTTP message. The HTTP message may include a message body, and may further include a uniform resource identifier (URI), a selection parameter, and the like. The message body may also be referred to as a main body of the message. The message body may include a parameter related to a service provided by the second service instance. The selection parameter may be used to indicate the service communication proxy to determine the second service instance and send a message to the second service instance.

Optionally, before step 330, the communication method shown in FIG. 3 may further include step 320.

Step 320: The service communication proxy finds whether there is a service instance that has a binding relationship with the target identifier. If the service communication proxy finds that the second service instance has the binding relationship with the target identifier, the service communication proxy sends the second message to the second service instance based on the first message.

It should be understood that the second message may be exactly the same as the first message. In this case, based on the target identifier in the first message, the service communication proxy uses the first message as the second message and directly forwards the first message to the second service instance. Certainly, the second message may alternatively be different from the first message. After receiving the first message, the service communication proxy may change the first message, use a changed first message as the second message, and send the second message to the second service instance. For example, the service communication proxy changes a header of the first message, but keeps a message body of the first message unchanged, to obtain the second message, and sends the second message to the second service instance. This is not specifically limited in this embodiment of this application.

It should be understood that the service communication proxy may pre-store a binding relationship between a target identifier and a service instance. When receiving the first message, the service communication proxy may find, based on the target identifier in the first message, whether there is a service instance that has a binding relationship with the target identifier. Alternatively, another network element (for example, an NRF or a data storage unit) may pre-store a binding relationship between a target identifier and a service instance. When the service communication proxy receives the first message, the service communication proxy searches for a corresponding service instance from the other network element based on the target identifier in the first message. The network element searches for the binding relationship between the target identifier and the service instance, and notifies the service communication proxy of a result; and the service communication proxy forwards a message to the target service instance, and so on. A storage location of the binding relationship between the target identifier and the service instance and a network element for searching the binding relationship are not specifically limited in this application.

Binding between the target identifier and the service instance is used to replace direct binding between service instances in other approaches. This can reduce coupling between service instances, and reduce complexity in processing of the service instances.

Alternatively, there may be no binding relationship between the target identifier and the service instance. In other words, the service communication proxy cannot find, based on the target identifier, a service instance that has a binding relationship with the target identifier. In this case, the service communication proxy may obtain an identifier of a target service set based on the first message, select another service instance from the set, and send the first message to the selected service instance.

Figure 4:
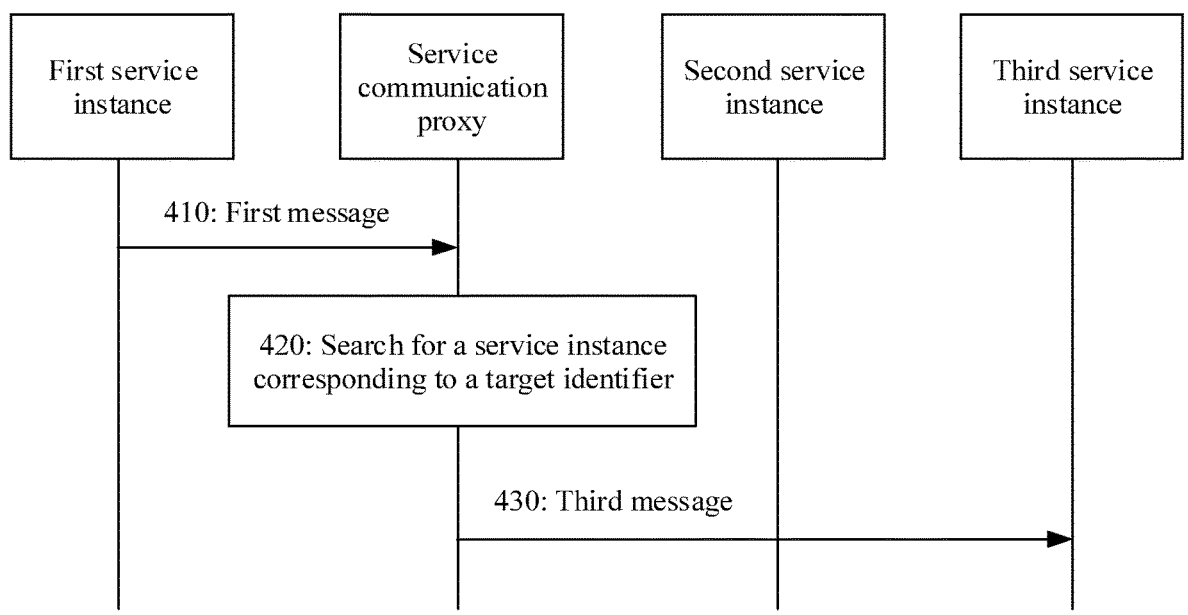
FIG. 4 is a schematic diagram of a communication method according to another embodiment of this application.

With reference to FIG. 4, the following describes a method used when there is no binding relationship on a service communication proxy.

FIG. 4 is a schematic diagram of a communication method according to another embodiment of this application. The method corresponding to FIG. 4 includes steps 410 to 430. The following describes steps 410 to 430.

Step 410: The service communication proxy receives a first message sent by a first service instance, where the first message includes a target identifier. Step 410 corresponds to step 310 in FIG. 3. Optionally, before step 410 is performed, the first service instance may also exchange a message with a second service instance, to obtain a target identifier corresponding to the second service instance. Details are not described herein.

Step 420: The service communication proxy finds whether there is a service instance that corresponds to the target identifier. When there is no service instance that has a binding relationship with the target identifier, step 430 is performed.

Step 430: When there is no service instance that has a binding relationship with the target identifier, the service communication proxy obtains an identifier of a target service set based on the first message, and selects a third service instance from the target service set based on the identifier of the target service set. The service communication proxy sends a third message to the third service instance based on the first message.

It can be learned from the foregoing descriptions that different service sets have different identifiers of the service sets. The identifier of the target service set is an identifier of a service set to which the second service instance belongs. In other words, the third service instance and the second service instance belong to the same service set.

It should be understood that the third message may be exactly the same as the first message. In this case, based on the target identifier in the first message, the service communication proxy uses the first message as the third message and directly forwards the first message to the second service instance. Certainly, the third message may alternatively be different from the third message. After receiving the first message, the service communication proxy may change the first message, use a changed first message as the third message, and send the third message to the second service instance. For example, the service communication proxy changes a header of the first message, but keeps a message body of the first message unchanged, to obtain the third message, and sends the third message to the second service instance. This is not specifically limited in this embodiment of this application.

Optionally, the service communication proxy may obtain the identifier of the target service set from the first message, where the first message further includes the identifier of the target service set. Alternatively, the service communication proxy obtains the identifier of the target service set from the target identifier in the first message, where the target identifier includes the identifier of the target service set. Alternatively, the service communication proxy determines an identifier of a service set as the identifier of the target service set, where the identifier of the service set has a mapping relationship with the target identifier in the first message.

It should be understood that a location of an information element that is in the first message and that is occupied by the identifier of the target service set is not specifically limited in this embodiment of this application. For example, the identifier of the target service set may occupy an information element in the target identifier, or may occupy an information element in the first message other than the target identifier; or the identifier of the target service set may be obtained based on the mapping relationship between the target identifier and the identifier of the service set.

It should be understood that a manner of selecting the third service instance is not specifically limited in this embodiment of this application. For example, a service instance having relatively light load may be selected from the target service set as the third service instance, or a service instance may be selected from the target service set as the third service instance in a polling mode. This is not specifically limited in this embodiment of this application.

When there is no service instance that has a binding relationship with the target identifier, a target service instance may be selected from the target service set based on the identifier of the target service set using a load balancing algorithm. This ensures load balancing between service instances in the target service set.

From a perspective of a service granularity, the foregoing target identifier may be an identifier related to a single user equipment, or may be an identifier related to one group of or a plurality of user equipments.

The foregoing describes, with reference to FIG. 2 to FIG. 4, a process in which the service communication proxy determines the target service instance based on the binding relationship between the target identifier and the service instance. Before the steps in FIG. 2 to FIG. 4 are performed, the binding relationship between the target identifier and the service instance may be further established.

It has been pointed out in the foregoing descriptions that the target identifier may be a preconfigured target identifier or a target identifier assigned in a communication message. For the foregoing different types of target identifiers, the embodiments of this application provide different manners of establishing a binding relationship between a target identifier and a service instance. When a target service instance is registered with a service communication proxy, the service communication proxy may assign a target identifier to the service instance, and send the target identifier to the service instance, to complete binding between the target identifier and the service instance. Alternatively, a target identifier is preconfigured on a service instance. In this case, the service instance sends the target identifier to a service communication proxy, and the service communication proxy stores a binding relationship between the service instance and the target identifier, to complete binding between the target identifier and the service instance. Alternatively, when a target identifier is a target identifier assigned by a service communication proxy or a service instance in a communication message, the service communication proxy establishes a binding relationship between the target identifier and the service instance. In this case, the target identifier may be assigned by the service communication proxy or the service instance. When the target identifier is assigned by the service communication proxy, the service communication proxy further inserts the target identifier in the communication message.

Figure 5:
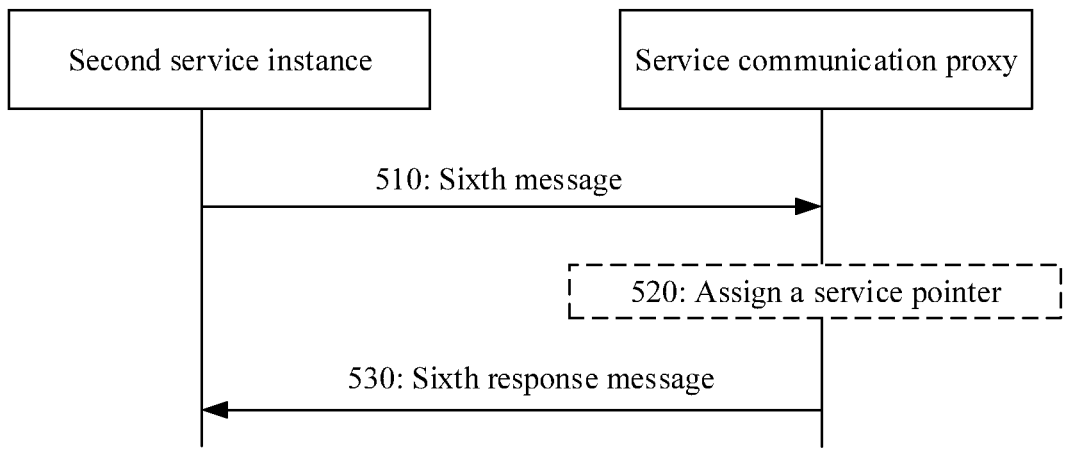
FIG. 5 is a schematic diagram of a communication method according to still another embodiment of this application.
Figure 6:
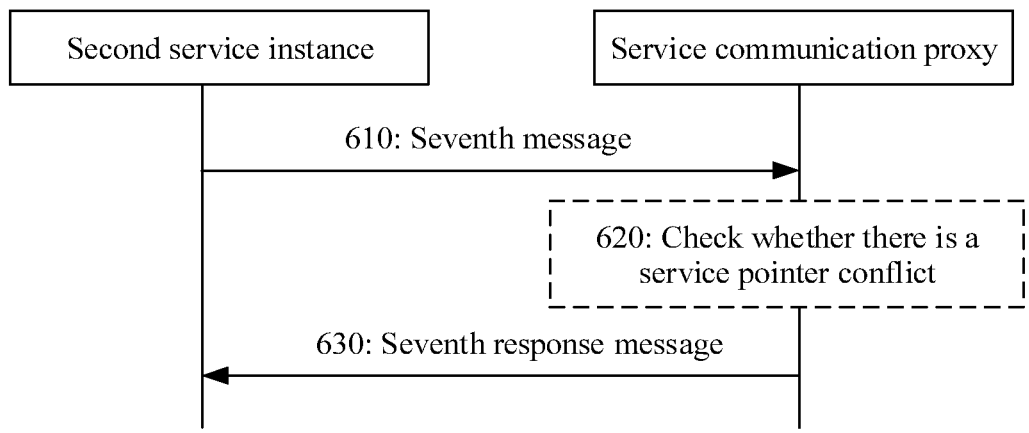
FIG. 6 is a schematic diagram of a communication method according to still another embodiment of this application.

The following describes a process in which a service communication proxy pre-establishes a binding relationship between a target identifier and a service instance. FIG. 5 and FIG. 6 each show a process of pre-establishing a binding relationship between a target identifier and a service instance. In an example, in FIG. 5 and FIG. 6, a process in which a service communication proxy pre-establishes the binding relationship between the target identifier and the service instance is described using an example in which the target identifier is a service pointer.

FIG. 5 includes steps 510 to 530. The following describes steps 510 to 530 in more detail.

Step 510: A second service instance sends a sixth message to the service communication proxy, where the sixth message is used by the second service instance to register with the service communication proxy.

It should be understood that the sixth message may include information about the second service instance. In this way, the service communication proxy binds the second service instance to the service pointer based on the information about the second service instance.

Specific information in the sixth message is not specifically limited in this embodiment of this application. For example, a registration request may include at least one of the following: an identifier of a service instance, a service type, manufacturer information, an identifier of a service set to which the service instance belongs, an area in which the service instance provides a service, or a network slice capability supported by the service instance. Based on different service types, the registration request may further carry other information such as a data network name (DNN).

Optionally, the sixth message may further include a service pointer corresponding to the second service instance, such that the service communication proxy binds the second service instance to the service pointer. In this case, the service pointer that corresponds to the second service instance and that is carried in the sixth message may be a service pointer preconfigured for the second service instance, for example, configured in a configuration file of the second service instance.

Optionally, the sixth message sent by the second service instance may include a capacity of the second service instance.

Optionally, the sixth message sent by the second service instance may include a quantity of service pointers that are applied for by the second service instance.

Optionally, before sending the sixth message to the service communication proxy, the second service instance may first need to discover a serving service communication proxy. For example, address information (for example, an FQDN or an IP address) of the serving service communication proxy may be preconfigured in the configuration file of the second service instance. Alternatively, the service instance discovers a serving service communication proxy using a discovery mechanism. For example, the second service instance may discover the serving service communication proxy by sending a broadcast or multicast message in a network, or using a discovery mechanism similar to a dynamic host configuration protocol (DHCP) server discovery mechanism. This is not specifically limited in this embodiment of this application.

Step 520: The service communication proxy assigns the service pointer to the second service instance based on the received sixth message.

The service communication proxy configures the service pointer for the service instance. This can implement automatic configuration of the service pointer.

When the sixth message includes the information about the second service instance, the service communication proxy may first determine, based on the information about the second service instance, a set to which the second service instance belongs. In other words, the service communication proxy may first determine, based on the information about the second service instance, an identifier of a service set to which the second service instance belongs.

For example, the service communication proxy may determine, based on the information such as the service type, the manufacturer information, the service area, and the network slice capability that are in the registration request, whether there is a service set with a same capability and a same manufacturer, and determine whether to add the second service instance to an existing service set. Alternatively, the service communication proxy creates a new service set. In an example, it is assumed that the second service instance is an AMF, a manufacturer is H, and the second service instance supports a network slice capability A and a service area B. If the service communication proxy determines that there is an existing service set, a service instance in the existing service set is an AMF, a manufacturer is also H, and the service instance also supports the network slicing capability A and the service area B, the service communication proxy may determine that the new service instance can be added to the existing service set. When the service communication proxy determines to add the second service instance to the existing service set, the service pointer assigned by the service communication proxy to the second service instance is different from a service pointer corresponding to another service instance in the service set to which the second service instance belongs, to avoid a conflict between service pointers in the same service set.

When the service pointer is assigned, the identifier of the service set to which the service instance belongs is also considered. Different service pointers are assigned to service instances in the same service set. This can avoid a conflict between service pointers in the service set.

The registration request carries the quantity of service pointers that are requested. In this way, the service instance requests, based on load of the service instance or other information, the service communication proxy to assign the service pointer, to ensure that a service related to a user equipment is managed at a proper granularity.

When the registration request includes the capacity of the second service instance, the service communication proxy may assign the service pointer or the like to the second service instance based on the capacity of the second service instance. The service communication proxy may determine, based on the capacity of the second service instance and a capacity of another service instance in the service set to which the second service instance belongs, the quantity of service pointers assigned to the second service instance.

Step 530: The service communication proxy sends a sixth response message to the second service instance. Optionally, if the service communication proxy assigns the service pointer to the second service instance, the sixth response message includes the service pointer assigned to the second service instance, and the sixth response message may be used to notify the second service instance of a service pointer assigned by the service communication proxy to the second service instance.

Optionally, the service communication proxy may notify, using the sixth response message, the second service instance that the service communication proxy has established a binding relationship between the second service instance and the service pointer.

Optionally, FIG. 6 shows another process of establishing a binding relationship between a service pointer and a service instance.

Step 610: A second service instance sends a seventh message to a service communication proxy, where the seventh message includes a service pointer corresponding to the second service instance.

Step 620: The service communication proxy may check whether the service pointer conflicts with a service pointer corresponding to another service instance in a service set to which the second service instance belongs. If there is a conflict, the service communication proxy may assign a new service pointer to the second service instance, to replace the conflicted service pointer.

Step 630: The service communication proxy sends a seventh response message to the second service instance. If the service communication proxy assigns the new service pointer to the second service instance in step 620, the seventh response message includes the new service pointer assigned by the service communication proxy to the second service instance.

It should be understood that FIG. 5 and FIG. 6 are used as examples in which a target identifier is a service pointer. Actually, the target identifier may alternatively have different formats. For example, when the target identifier is related to one user equipment, the target identifier may be at least one of an IP address or a port number of the service communication proxy. Alternatively, the target identifier may include an identifier of the service set to which the second service instance belongs and a unique identifier in the service set. Alternatively, the target identifier is a value that is assigned by the service communication proxy and that is unique on the service communication proxy. This is not limited in this application. When the target identifier is related to a group of user equipments, the target identifier may be an identifier of the service set corresponding to the second service instance, or include an identifier of the service set and an identifier of the second service instance or an identifier of the service set and a unique service pointer in the service set, where the service pointer is used to identify the group of user equipments served by the service set, and so on. This is not limited in this application.

It should be understood that the process that is shown in FIG. 5 or FIG. 6 and in which the binding relationship between the service instance and the target identifier is established may be completed by the service communication proxy. Alternatively, after receiving the sixth message or the seventh message, the service communication proxy may forward the message to an NRF or another network function, and the NRF or the other network function establishes the binding relationship between the service instance and the target identifier. In this case, the service communication proxy is responsible for only forwarding the message. This is not specifically limited in this embodiment of this application.

It should be further understood that in the solutions in FIG. 5 and FIG. 6, when receiving the sixth message or the seventh message, the service communication proxy may alternatively only assign the target identifier to the service instance, but not store the binding relationship between the service instance and the target identifier. In this case, the service communication proxy has not established the binding relationship between the service instance and the target identifier. The establishment of the binding relationship between the service instance and the target identifier corresponding to the service instance may be triggered using a communication message.

The following describes another manner of establishing a binding relationship between a target identifier and a service instance, namely, a process in which a service communication proxy is triggered to establish a binding relationship between a target identifier and a service instance using a message in a communication process.

The service communication proxy may further receive a fourth message sent by a second service instance, and the service communication proxy obtains a binding relationship between the target identifier and the second service instance based on the fourth message.

Optionally, the fourth message may carry the binding relationship between the second service instance and the target identifier. In this case, the service communication proxy may obtain the binding relationship that is between the second service instance and the target identifier and that is carried in the fourth message. For example, the fourth message may carry a binding relationship between an IP address of the second service instance and the target identifier. In this case, the service communication proxy may obtain the binding relationship between the IP address of the second service instance and the target identifier when receiving the fourth message.

It should be understood that the fourth message used to trigger establishment of the binding relationship may have a plurality of forms. For example, the fourth message may be a dedicated binding request message sent by the second service instance to the service communication proxy. The binding request message may carry one or more target identifiers. The target identifier in the binding request message may be a target identifier preconfigured on the service instance, or may be a target identifier assigned by the service communication proxy in the binding request message.

Alternatively, the fourth message may be a common message related to a user equipment. For example, the fourth message is a message sent to another service instance. The other service instance may be a first service instance, or may be a service instance other than the first service instance. The following uses an example in which the other service instance is the first service instance for description. In an implementation, when sending the fourth message to the first service instance, the second service instance adds the target identifier to the fourth message. The service communication proxy obtains the target identifier from the fourth message, and establishes the binding relationship between the target identifier and the second service instance. In another implementation, the fourth message does not carry the target identifier, but the fourth message carries an indication. The service communication proxy determines, based on the indication, that the service communication proxy needs to assign the target identifier and binds the target identifier to the second service instance.

Alternatively, the target identifier may be a target identifier assigned by the second service instance when the second service instance sends the fourth message. Alternatively, the target identifier may be a target identifier assigned by the service communication proxy to the second service instance when the service communication proxy receives the fourth message sent by the second service instance. In an example, when the service instance is an SMF, and the SMF sends the fourth message related to the user equipment, the SMF may assign a session reference identifier (corresponding to smContextRef in Technical Specification (TS) 29.502) for a context of the user equipment. The session reference identifier is used by the SMF to uniquely identify a session context of one user equipment. The session reference identifier may be used as the target identifier, such that the SMF can be found based on the session reference identifier.

Optionally, the fourth message may carry a binding indication. When the fourth message includes the target identifier, the binding indication is used to indicate the service communication proxy to record the target identifier in the fourth message. Alternatively, when the fourth message does not include the target identifier, the service communication proxy assigns the target identifier to the second service instance when receiving the binding indication.

It should be understood that, when the fourth message is a message related to the user equipment, and the target identifier is assigned by the service communication proxy, the service communication proxy further needs to send the target identifier to the first service instance. For example, the target identifier may be inserted in the fourth message.

It should be understood that a case in which the fourth message carries the binding indication may also be referred to as explicit binding.

Optionally, the fourth message carries a binding timer. The binding timer is used to release the binding relationship between the target identifier and the second service instance after the binding timer expires.

A binding time for binding the service instance and the target identifier may be customized using the binding timer, such that another service instance can be selected after the binding timer expires. In this way, load balancing is better supported.

The foregoing describes the process of establishing the binding relationship between the target identifier and the service instance. In some cases, the target identifier may be further unbound from the service instance.

Optionally, the service communication proxy may further receive a fifth message sent by the second service instance, where the fifth message is used to request to release the binding relationship between the target identifier and the second service instance; or start the binding timer, and release the binding relationship between the target identifier and the second service instance after the binding timer expires.

The service communication proxy may unbind the target identifier from the second service instance when the service communication proxy receives the fifth message or when the timer expires.

It should be understood that the service instance may initiate an unbinding request when the service instance has relatively heavy load, goes offline, fails, or the like, to notify the service communication proxy to unbind the target identifier from the service instance. This ensures that a service related to the user equipment can be removed from the service instance in any one of the foregoing cases.

The fifth message may further carry indication information. The indication information is used to indicate the service communication proxy to bind the target identifier to a third service instance.

The unbinding request carries the indication information, to indicate to unbind the target identifier from the original service instance and to bind the target identifier to another service instance. This completes service load transfer between the service instances, and implements load balancing between the service instances.

As described above, the target identifier may be one of service pointers (which may also be referred to as instance pointers) preconfigured for the service instance. In this case, each service pointer may correspond to a plurality of user equipments. In other words, the plurality of user equipments served by the service instance may share a same service pointer.

The target identifier may have different formats. For example, when the target identifier is related to one user equipment, the target identifier may be at least one of an IP address or a port number of the service communication proxy. Alternatively, the target identifier may include an identifier of a service set to which the second service instance belongs and a unique identifier in the service set. Alternatively, the target identifier is a value that is assigned by the service communication proxy and that is unique on the service communication proxy. This is not limited in this application. When the target identifier is related to a group of user equipments, the target identifier may be an identifier of a service set corresponding to the second service instance, or include an identifier of the service set and an identifier of the second service instance or an identifier of the service set and a unique service pointer in the service set, where the service pointer is used to identify the group of user equipments served by the service set, and so on. This is not limited in this application.

Target identifiers at different granularities can be used to implement service management at different granularities.

For ease of understanding, the following separately describes, using two detailed embodiments, the communication method provided in the embodiments of this application.

Figure 7:
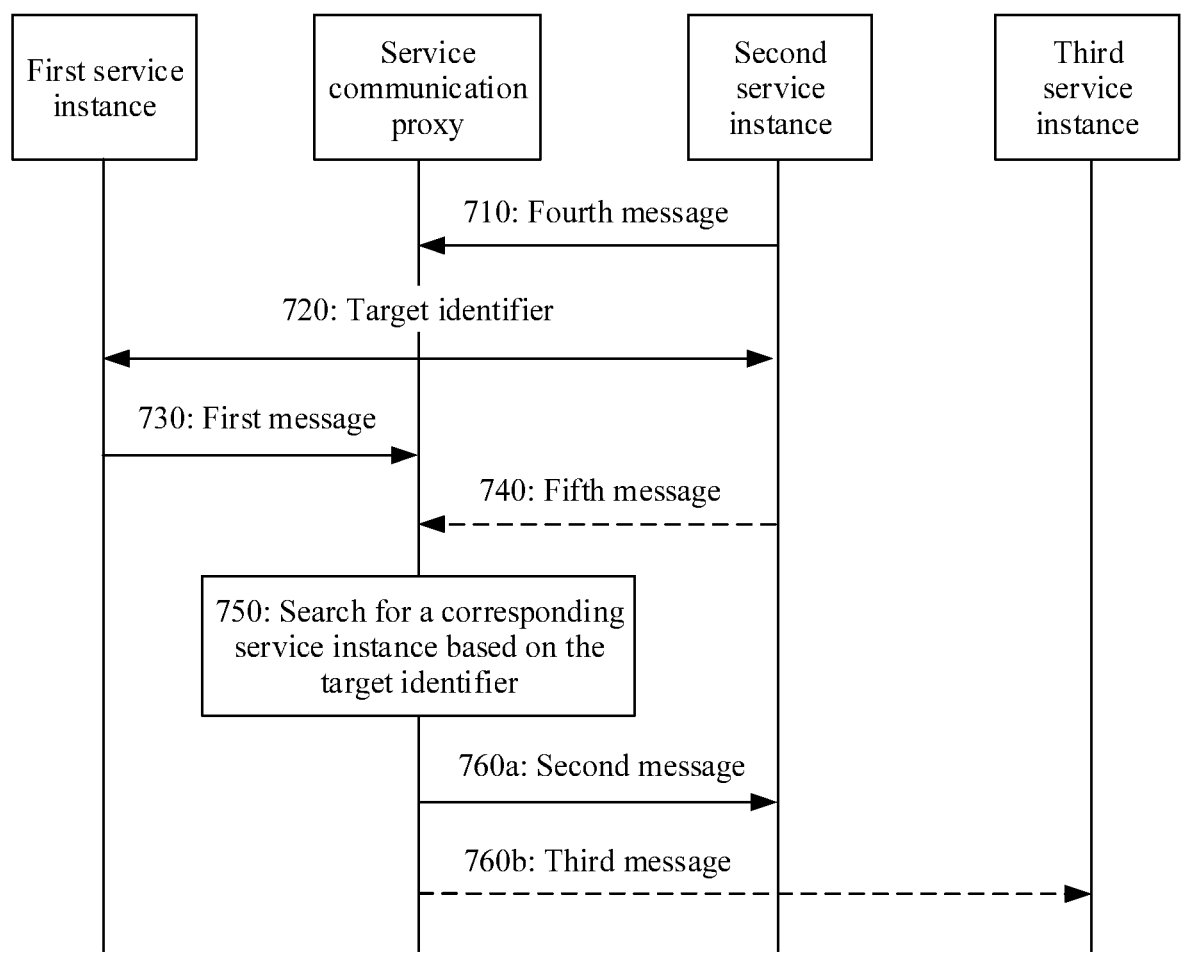
FIG. 7 is a schematic diagram of a communication method according to still another embodiment of this application.

FIG. 7 is a schematic diagram of a communication method according to still another embodiment of this application. The method shown in FIG. 7 includes steps 710 to 760*b*. The steps shown in FIG. 7 may be performed to implement a binding and unbinding method based on a granularity of a group of user equipments.

Step 710: A second service instance sends a fourth message to a service communication proxy.

The fourth message is a binding request specially sent by the second service instance to the service communication proxy, and includes a target identifier corresponding to the second service instance. The service communication proxy receives the binding request, and records a binding relationship that is between the second service instance and the target identifier and that is in the binding request.

Step 720: A first service instance and the second service instance exchange a message related to a user equipment. In this process, the second service instance sends the target identifier corresponding to the second service instance to the first service instance. After receiving the target identifier corresponding to the second service instance, the first service instance stores the target identifier in a context of the user equipment.

In an example, the first service instance may be an AMF, and the second service instance may be an SMF. The AMF may send a create session request to the SMF, and the SMF sends a create session response to the AMF, and includes, in the create session response, a target identifier corresponding to the SMF. After receiving the target identifier corresponding to the SMF, the AMF stores the target identifier in the context of the user equipment.

It should be understood that step 710 and step 720 are not sequential in this embodiment of this application. This is not limited in this embodiment of this application.

Step 730: The first service instance sends a first message to the service communication proxy, where the first message carries the target identifier corresponding to the second service instance and an identifier of a service set corresponding to the second service instance. For example, the first service instance obtains the target identifier from the context of the user equipment, and adds the target identifier to the first message.

When the first message is an HTTP message, the target identifier and the identifier of the service set may be located in a header of the HTTP message, to help the service communication proxy read the target identifier.

It should be noted that there is no relationship between the first message and the fourth message. In this embodiment, both the fourth message and the first message are sent to the service communication proxy. However, during actual deployment, the fourth message may alternatively be a message sent to another service instance. For example, when the first service instance is an AMF, and the second service instance is an SMF, the fourth message may be a message sent by the AMF to a UDM. For example, the AMF sends the message to the UDM in a registration process of the user equipment, and a binding relationship between the target identifier and the first service instance (namely, the AMF) is established in this process. When the target identifier is related to a group of user equipments, the fourth message and the first message may also be messages for different user equipments in a same user group. This is not specifically limited in this embodiment.

Step 750: The service communication proxy finds, based on the target identifier carried in the first message, whether there is a service instance corresponding to the target identifier. If the service communication proxy records the binding relationship between the second service instance and the target identifier in step 710, the service communication proxy finds that the service instance corresponding to the target identifier is the second service instance.

Step 760a: The service communication proxy sends a second message to the second service instance based on the first message.

It should be understood that the second message may be exactly the same as the first message. In this case, based on the target identifier in the first message, the service communication proxy uses the first message as the second message and directly forwards the first message to the second service instance. Certainly, the second message may alternatively be different from the first message. After receiving the first message, the service communication proxy may change the first message, for example, change a header of the first message, but keep a message body of the first message unchanged, to obtain the second message, and send the second message to the second service instance. This is not specifically limited in this embodiment of this application.

At a subsequent time, for example, when perceiving that service load is excessively heavy, the second service instance determines to unbind the target identifier from the second service instance.

Optionally, Step 740: The second service instance sends a fifth message to the service communication proxy. The unbinding request is used to request the service communication proxy to delete the binding relationship between the second service instance and the target identifier.

There may be one or more target identifiers for which unbinding is requested in the binding request. After receiving the unbinding request sent by the second service instance, the service communication proxy may delete the binding relationship between the second service instance and the target identifier.

Optionally, the unbinding request may further include indication information. The indication information is used to indicate to bind the target identifier corresponding to the second service instance to another service instance, for example, a third service instance in FIG. 7.

Step 760b: Assuming that the service communication proxy has unbound the target identifier corresponding to the second service instance from the second service instance in step 740, and the service communication proxy cannot find, in step 750, a service instance corresponding to the target identifier in the first message, the service communication proxy may obtain an identifier of a target service set based on the first message.

The third service instance may be randomly selected. Alternatively, a service instance may be selected from the target service set as the third service instance using a load balancing algorithm.

Optionally, the service communication proxy may obtain the identifier of the target service set from the first message, where the first message further includes the identifier of the target service set. Alternatively, the service communication proxy obtains the identifier of the target service set from the target identifier in the first message, where the target identifier includes the identifier of the target service set. Alternatively, the service communication proxy determines an identifier of a service set as the identifier of the target service set, where the identifier of the service set has a mapping relationship with the target identifier in the first message.

The service communication proxy selects the third service instance from the target service set, and sends a third message to the third service instance based on the first message.

It should be understood that the third message may be exactly the same as the first message. In this case, based on the target identifier in the first message, the service communication proxy uses the first message as the third message and directly forwards the first message to the second service instance. Certainly, the third message may alternatively be different from the third message. After receiving the first message, the service communication proxy may change the first message, for example, change a header of the first message, but keep a message body of the first message unchanged, to obtain the third message, and send the third message to the second service instance. This is not specifically limited in this embodiment of this application.

In step 740, if the second service instance determines to unbind a current service pointer from the second service instance, and indicates the service communication proxy to transfer the current service pointer to the third service instance, the service communication proxy unbinds the target identifier from the second service instance according to the unbinding request, and binds the target identifier to the third service instance. In this case, the service communication proxy selects the third service instance based on the target identifier, and sends the third message to the third service instance.

Figure 8:
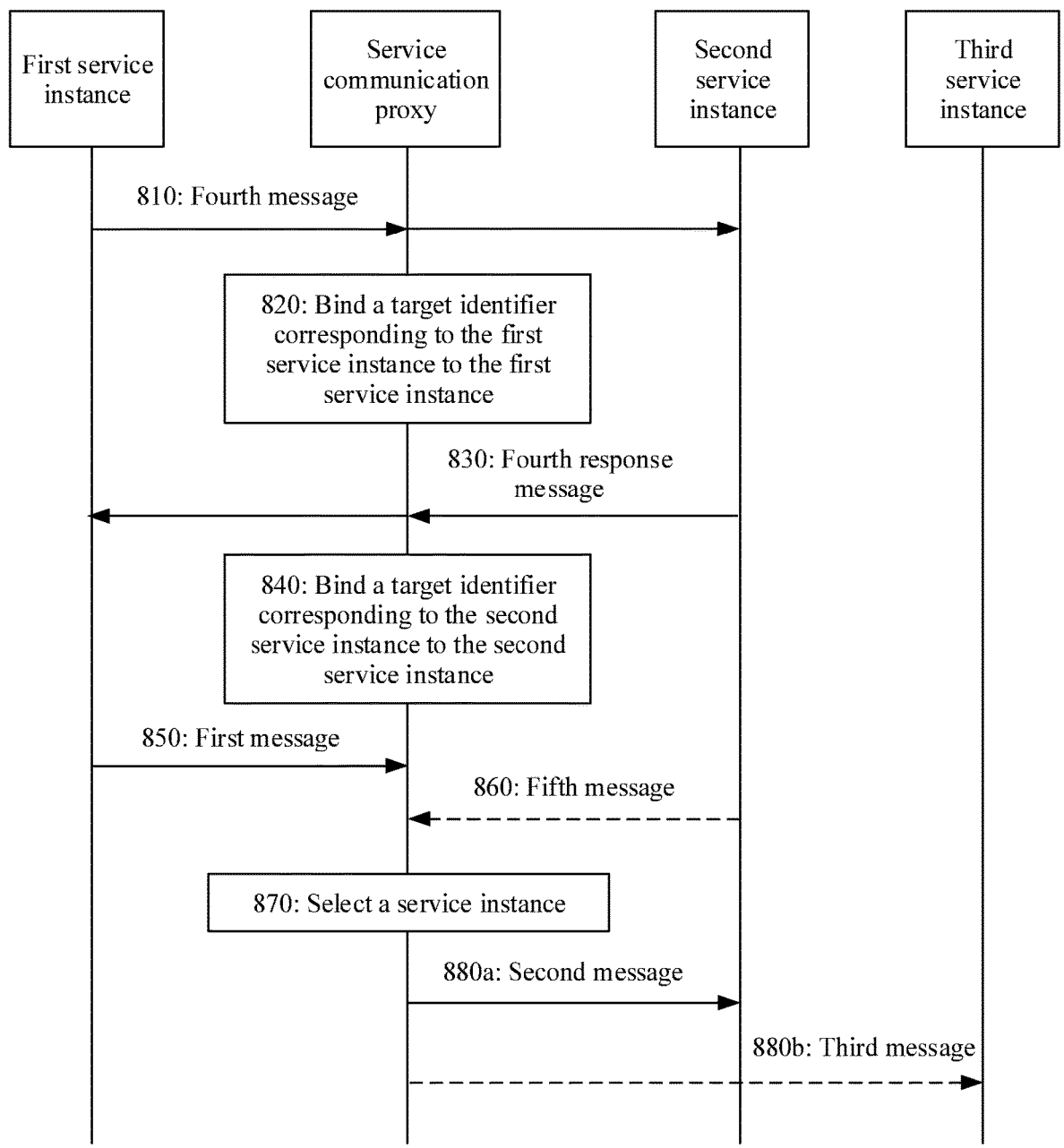
FIG. 8 is a schematic diagram of a communication method according to still another embodiment of this application.

In the method corresponding to FIG. 7, the fourth message is a dedicated binding request. With reference to FIG. 8, the following describes in detail a procedure in which a fourth message is a message related to a user equipment. The method in FIG. 8 includes steps 810 to 880b.

Step 810: A first service instance sends the fourth message to a service communication proxy. The fourth message is a message related to the user equipment.

The first service instance may add, to the fourth message, a target identifier assigned by the first service instance to the user equipment. In an implementation, the target identifier may be used by the service instance to uniquely locate a context of the user equipment. For example, the first service instance may be an AMF. In this case, a target identifier corresponding to the AMF is an identifier of the user equipment, and the target identifier may be a 5G globally unique temporary identity (GUTI), a subscriber permanent identifier (SUPI), a permanent equipment identifier (PEI), or the like. The AMF may uniquely locate a context of one user equipment based on the target identifier. Alternatively, the first service instance may be an SMF. In this case, a target identifier corresponding to the SMF may be a session reference identifier (for example, smContextRef) assigned by the SMF.

The fourth message is used to trigger to establish a binding relationship between the target identifier and a service instance. A difference between this method and the method shown in FIG. 7 is: The fourth message in step 810 is not a dedicated binding request, but a common message related to the user equipment. For example, when the first service instance and a second service instance are an AMF and an SMF, respectively, the fourth message may be a create session request message. When a session is created, to send the fourth message to the SMF, the first service instance, namely, the AMF, may add an identifier of a service set corresponding to the SMF to the fourth message, such that the service communication proxy selects the peer SMF based on the identifier of the service set.

It should be understood that the target identifier may be obtained by the first service instance. For example, the first service instance requests a shared data layer corresponding to the service set, to assign the target identifier. Alternatively, target identifier segments may be configured on each service instance. In this case, the first service instance selects a target identifier from target identifier segments configured on the first service instance. When the target identifier is assigned by the first service instance, the fourth message carries the target identifier assigned by the first service instance. Optionally, the first service instance may add a binding indication to the fourth message, to indicate that the first service instance wants the service communication proxy to establish a binding relationship between the target identifier and the first service instance.

In addition, the target identifier may alternatively be assigned by the service communication proxy when the fourth message is received. When the target identifier is assigned by the service communication proxy, the fourth message does not carry the target identifier, but the service communication proxy assigns the target identifier when receiving the fourth message. In addition, the first service instance may add an indication to the fourth message, and the service communication proxy assigns the target identifier only after receiving the indication. When the target identifier is assigned by the service communication proxy, the service communication proxy further needs to send the target identifier to the second service instance. For example, the service communication proxy may insert the target identifier in the fourth message.

The fourth message may be an HTTP message or an AMQP message. When the fourth message is the HTTP message, the identifier of the service set is carried in an HTTP host name field in the fourth message.

Optionally, the fourth message may further carry a binding timer. The binding timer is used to release the binding relationship between the target identifier and the first service instance after the binding timer expires.

Step 820: The service communication proxy binds the target identifier to the first service instance.

For example, the service communication proxy stores the binding relationship between the target identifier and the first service instance.

The service communication proxy adds, to the fourth message, a target identifier corresponding to the first service instance and an identifier of a service set to which the first service instance belongs, and forwards the fourth message to the second service instance. In some implementations, the service communication proxy may perform some processing on the fourth message, for example, delete some fields from the fourth message or add some fields to the fourth message. This is not limited in this embodiment.

Step 830: The service communication proxy receives a fourth response message sent by the second service instance, and forwards the fourth response message to the first service instance.

In an example, when the fourth message is a create session request message, the fourth response message is a create session response message. The second service instance may add, to the fourth response message, a target identifier corresponding to the second service instance, an identifier of a service set to which the second service instance belongs, the identifier of the service set to which the first service instance belongs, and the target identifier corresponding to the first service instance, and send the fourth response message to the service communication proxy. The service communication proxy determines the first service instance based on the target identifier corresponding to the first service instance (the binding is established in step 810 and step 820), and forwards the fourth response message to the first service instance.

Step 840: The service communication proxy binds the target identifier corresponding to the second service instance to the second service instance based on the fourth response message. For example, the service communication proxy may record a binding relationship between the second service instance and the target identifier. For a binding method, refer to step 810 and step 820.

After steps 810 to 840 are performed, the service communication proxy has established binding relationships between target identifiers and service instances, where the binding relationships include the binding relationship between the second service instance and the target identifier corresponding to the second service instance and the binding relationship between the first service instance and the target identifier corresponding to the first service instance. In addition, after steps 810 to 840 are performed, the first service instance and the second service instance each have obtained the target identifier corresponding to the peer service instance.

Step 850: The first service instance may send a first message to the service communication proxy, where the first message includes the target identifier corresponding to the second service instance, the identifier of the service set corresponding to the second service instance, and the target identifier corresponding to the first service instance. The service communication proxy may select a service instance based on the target identifier corresponding to the second service instance in the first message.

The first message is a message related to the user equipment. For example, when the first service instance and the second service instance are an SMF and an AMF, respectively, the first message may be a message in a session-related procedure related to the user equipment. Certainly, the first message may alternatively be a message in another procedure. This is not specifically limited in this embodiment of this application.

It should be noted that there is no relationship between the first message and the fourth message. In this embodiment, both the fourth message and the first message may be sent to the second service instance. However, during actual deployment, the fourth message may alternatively be a message sent to another service instance. For example, when the first service instance is an AMF, and the second service instance is an SMF, the fourth message may be a message sent by the AMF to a UDM. For example, the AMF sends the message to the UDM in a registration process of the user equipment, and the binding relationship between the target identifier and the first service instance (namely, the AMF) is established in this process. When the target identifier is related to a group of users, the fourth message and the first message may also be messages for different user equipments in a same user group. This is not specifically limited in this embodiment.

Step 870: The service communication proxy selects a service instance based on the target identifier in the first message. If the service communication proxy stores the binding relationship between the target identifier corresponding to the second service instance and the second service instance in step 840, the service communication proxy may select the second service instance as the peer service instance.

Step 880a: The service communication proxy sends a second message to the second service instance based on the first message.

It should be understood that the second message may be exactly the same as the first message. In this case, based on the target identifier in the first message, the service communication proxy uses the first message as the second message and directly forwards the first message to the second service instance. Certainly, the second message may alternatively be different from the first message. After receiving the first message, the service communication proxy may change the first message, for example, change a header of the first message, but keep a message body of the first message unchanged, to obtain the second message, and send the second message to the second service instance. This is not specifically limited in this embodiment of this application.

Optionally, step 860: The service communication proxy receives a fifth message sent by the second service instance, where the fifth message is used to request the service communication proxy to release the binding relationship between the second service instance and the target identifier. The fifth message may carry the target identifier corresponding to the second service instance. The service communication proxy may delete, based on the fifth message, the binding relationship between the second service instance and the target identifier corresponding to the second service instance.

Optionally, the fifth message may further include indication information. The indication information is used to indicate to bind the target identifier corresponding to the second service instance to another service instance, for example, a third service instance in FIG. 8. In this case, in step 870, the service communication proxy selects the third service instance based on the target identifier carried in the first message; and in step 880*a*, the service communication proxy sends a third message to the third service instance based on the first message. For example, the fifth message may be initiated when the second service instance determines to store a context of the user equipment into the shared data layer.

It should be understood that a reason why the second service instance sends an unbinding request is not specifically limited in this embodiment of this application. For example, the reason may be that the second service instance does not want to process a procedure related to the user equipment, or that the second service instance goes offline, or that the second service instance fails.

In this case, in step 870, the service communication proxy selects the peer service instance based on the target identifier in the first message. The service communication proxy has released the binding relationship between the second service instance and the target identifier in step 860.

In this case, step 880*b*: The service communication proxy may search for the corresponding service set based on the identifier that is of the service set and that is carried in the first message, and select the third service instance from the set. The service communication proxy sends a third message to the third service instance based on the first message.

Optionally, the service communication proxy may obtain an identifier of a target service set from the first message, where the first message further includes the identifier of the target service set. Alternatively, the service communication proxy obtains an identifier of a target service set from the target identifier in the first message, where the target identifier includes the identifier of the target service set. Alternatively, the service communication proxy determines an identifier of a service set as an identifier of a target service set, where the identifier of the service set has a mapping relationship with the target identifier in the first message.

It should be understood that the first message, the second message, and the third message may carry the identifier of the service set, and the identifier of the service set may be carried in the target identifier or may be used as an independent information element. When the identifier of the service set is carried, a target identifier conflict can be avoided in the same service set. Certainly, if it can be ensured that all service instances in a network correspond to different target identifiers during assignment of the target identifiers, a message may not carry the identifier of the service set. In this case, if there is no binding relationship between the target identifier and a target service instance, the service communication proxy may determine a target service set based on the target identifier, and select a service instance from the target service set. This is not specifically limited in this embodiment of this application.

Figure 9:
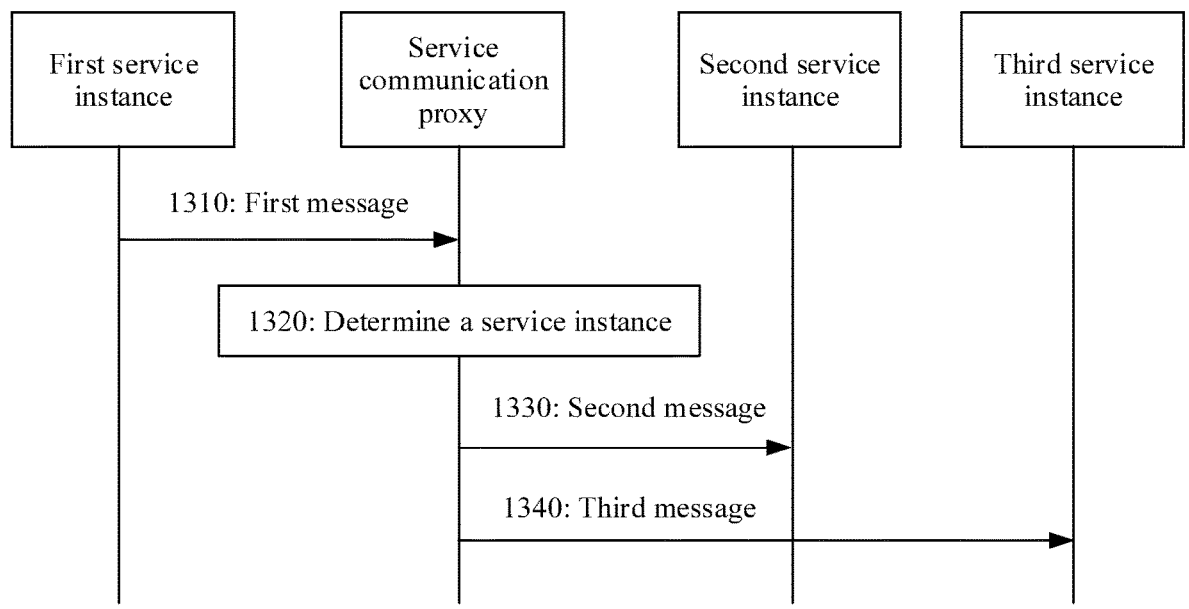
FIG. 9 is a schematic diagram of a communication method according to still another embodiment of this application.

FIG. 9 is a schematic diagram of a communication method according to still another embodiment of this application.

Step 1310: A first service instance sends a first message to a service communication proxy, where the first message includes a target identifier.

The target identifier may be related to one user equipment or a group of user equipments. In other words, the target identifier is determined based on a user equipment.

With reference to the descriptions in FIG. 2 to FIG. 8, the target identifier may be used to identify one user equipment or a group of user equipments. For example, the target identifier may include a service pointer. The service communication proxy determines to bind the user equipment to a second service instance. The service communication proxy determines, based on the target identifier, a service instance to which the service pointer is bound. The service instance to which the service pointer is bound serves the user equipment, and the service instance to which the service pointer is bound may be the second service instance. The binding relationship is changeable. For example, after the service communication proxy unbinds the service pointer from the second service instance, the service communication proxy may bind the service pointer to another service instance. The target identifier may be included in a network tag field in the first message or a newly added optional HTTP header in the first message.

Alternatively, the target identifier may include an identifier of a target service set corresponding to the user equipment and/or an identifier of the second service instance corresponding to the user equipment. In other words, the user equipment is bound to the second service instance.

That the target identifier is an identifier of the target service set may be considered that the user equipment is bound to the target service set. The service communication proxy may determine, from the target service set, a service instance to serve the user equipment. For example, the service communication proxy selects the second service instance or a third service instance to serve the user equipment.

That the target identifier may include the identifier of the second service instance may be considered that the user equipment is bound to the second service instance. The identifier of the second service instance is used to identify the second service instance. The identifier of the second service instance may be address information of the second service instance, for example, an IP address or an FQDN, or may be a sequence number assigned by the service communication proxy to the second service instance. The service communication proxy may uniquely determine the second service instance based on the identifier of the second service instance. The service communication proxy may determine that the second service instance continues to serve the user equipment. The target identifier may further include the identifier of the target service set.

The identifier of the second service instance may be included in a URI in the first message, or included in a selection parameter in the first message.

In an implementation, the first message may include binding manner indication information. The binding manner indication information is used to indicate a manner of binding one user equipment or a group of user equipments. In other words, the binding manner indication information is used to indicate whether the user equipment is bound to a service instance or bound to a service set. This indication manner is an explicit indication manner. The first message may explicitly indicate a binding manner using the binding manner indication information. The binding manner indication information may be an enumeration field. For example, the binding manner indication information may be one of a plurality of values. To be more specific, the indication information is either of values in {bind to a service instance, bind to a service set}. For example, "0" indicates that the user equipment is bound to a service instance, and "1" indicates that the user equipment is bound to a service set.

The binding manner indication information may be a bitmap. For example, the binding manner indication information may be represented using N bits. Each bit indicates a binding possibility. For example, the indication information may be represented using two bits. One bit is used to indicate "bind to a service instance". When the bit is 1, it indicates that the user equipment is bound to a service instance; and when the bit is 0, it indicates that the user equipment is not bound to a service instance. The other bit is used to indicate "bind to a service set". When the bit is 1, it indicates that the user equipment is bound to a service set; and when the bit is 0, it indicates that the user equipment is not bound to a service set.

In this bitmap method, when the user equipment is bound to the second service instance, the target identifier may include or not include the identifier of the second service instance. For example, the target identifier may include the service pointer corresponding to the second service instance. When there is no binding relationship between the user equipment and the second service instance, or when there is a binding relationship between the user equipment and the second service instance but the second service instance is unavailable (for example, the second service instance is powered off), the service pointer is used to select a service instance to serve the user equipment.

In another implementation, the service communication proxy determines a binding relationship indication based on the target identifier. In other words, the first message may implicitly indicate a binding relationship. For example, when the target identifier includes the identifier of the second service instance and/or the service pointer, the service communication proxy determines that the user equipment is bound to the second service instance. The target identifier may further include the identifier of the target service set. When the target identifier includes only the identifier of the service set, the service communication proxy determines that the user equipment is bound to a service set.

Before step S1310, the first service instance may receive the target identifier.

Before step S1310, the first service instance may receive the target identifier sent by the second service instance. The second service instance may send an eighth message to the first service instance, where the eighth message includes the target identifier. For example, when the target identifier includes the identifier of the second service instance, the eighth message includes a URI. The URI may include the address information of the second service instance, and the address information of the second service instance is used as the identifier of the second service instance. Alternatively, a message body of the eighth message includes the identifier of the second service instance. In addition, the message body of the eighth message may further include the service pointer, the identifier of the service set, and the like. The eighth message may be an HTTP message. The eighth message further includes the binding relationship indication information. The binding relationship indication information may be included in a network tag field (Cookie) in the eighth message or a newly added optional HTTP header in the eighth message. In this embodiment of this application, a new optional HTTP header that is called a binding indication may be added. Herein, that the new header is called the binding indication is merely used as an example, and a specific name of the newly defined HTTP header is not specifically specified in this embodiment. The eighth message further includes the identifier of the service set. The identifier of the service set may be included in at least one field in a URI field in the eighth message, a message body field in the eighth message, the network tag field in the eighth message, or a newly added optional HTTP header field in the eighth message. To be more specific, the identifier of the service set may be located in the URI, the message body, the network tag field, or the newly added optional HTTP header in the eighth message.

Before step S1310, the second service instance may receive capability indication information of the first service instance. The capability indication information is used to indicate whether the first service instance supports selection of a service instance from the service set.

The second service instance determines, based on a capability of the first service instance, binding manner indication information corresponding to a session. This avoids a case in which message redirection is performed for excessive times when a second message cannot be sent or is sent to another unwanted service instance because the second service instance sets the binding manner indication information to bind to a service set when the first service instance does not support selection of a service instance from the service set.

For example, the second service instance is an SMF, and the first service instance is an AMF. After the AMF sends a session establishment request to the SMF, the SMF sends a session establishment response message to the AMF. The session establishment response message includes a resource URI, and the resource URI includes the address information of the second service instance. A network tag field in the session establishment response message may include the identifier of the service set and the binding indication information. The session establishment response message may further include another target identifier, for example, a service pointer. In this case, the AMF sends a first message to the SMF. The first message is a session modification request. In this case, a URI in the first message is the same as the resource URI included in the session establishment response message, and the modification request message includes the identifier of the service set and the binding indication information that are included in the session establishment response message.

For another example, the first service instance is an SMF, and the second service instance is an AMF. When the AMF sends a session establishment request to the SMF, the AMF may send an identifier of the AMF, a binding relationship indication, an identifier of a service set to which the AMF belongs, and the like to the SMF. In this case, when the SMF needs to send a message to the AMF for the session, the SMF uses the identifier of the AMF as a selection parameter and adds the identifier of the AMF to a first message. In addition, the first message carries the binding relationship indication and the identifier of the service set to which the AMF belongs.

The service communication proxy receives the first message. The identifier of the second service instance is used to indicate the service communication proxy to send a second message to the second service instance based on the identifier of the second service instance. For example, when the binding manner indication information indicates that the user equipment is bound to the second service instance, information about the identifier of the second service instance is used to indicate the service communication proxy to send the second message to the second service instance based on the information about the identifier of the second service instance. The service communication proxy may select a service instance from the service set based on the identifier of the service set. For example, when the binding manner indication information indicates that the user equipment is bound to a service set, or when the second service instance is unavailable, the service communication proxy may select an available service instance from the service set based on the identifier of the service set, such that the service instance serves the user equipment.

Step 1320: Determine a service instance corresponding to the target identifier.

If the binding indication information indicates that the user equipment is bound to the second service instance, the service communication proxy determines that the second service instance is a device for receiving the second message, and performs step 1330. In step 1330, the service communication proxy sends the second message to the second service instance. The target identifier includes, for example, the service pointer and the identifier of the second service instance.

If the binding indication information indicates that the user equipment is bound to the second service instance, but the second service instance is unavailable, the service communication proxy determines a third service instance that is available from the service set to which the second service instance belongs, and performs step 1340. In step 1340, the service communication proxy sends a third message to the third service instance.

If the user equipment is bound to a service set, the service communication proxy determines the second service instance from the service set, and performs step 1330. For example, if the binding indication information indicates that the user equipment is bound to a service set, the service communication proxy determines the second service instance from the service set, and performs step 1330. In step 1330, the service communication proxy sends the second message to the second service instance.

Step 1330: The service communication proxy sends the second message.

It should be understood that the second message may be exactly the same as the first message. In this case, based on the target identifier in the first message, the service communication proxy uses the first message as the second message and directly forwards the first message to the second service instance. Certainly, the second message may alternatively be different from the first message. After receiving the first message, the service communication proxy may change the first message, for example, change a header of the first message, but keep a message body of the first message unchanged, to obtain the second message, and send the second message to the second service instance.

The first message is an HTTP message. If the first service instance receives the resource URI sent by the second service instance, and an authorized domain (Authority) field in the resource URI includes the address information of the second service instance, for example, the IP address or the FQDN, namely, includes the identifier of the second service instance, the resource URI is used in the URI of the first message, in other words, the URI of the first message includes the resource URI. The service communication proxy determines, based on the binding manner indication information, whether the user equipment is bound to the second service instance. When the binding manner indication information indicates that the user equipment is bound to the second service instance, the service communication proxy sends the second message to the second service instance that has a binding relationship with the target identifier. If the first message is the HTTP message, the service communication proxy sends the second message to the second service instance based on an address of the second service instance in the URI of the first message. The second message may include information about the URI in the first message. In other words, the URI in the second message may be the same as the URI in the first message.

The first message is an HTTP message. If the first service instance receives the identifier of the second service instance from the second service instance, and the identifier is not in the resource URI, the first message includes the selection parameter, and the selection parameter includes the identifier of the second service instance. The service communication proxy may determine, based on the binding manner indication information in the first message, that the user equipment is bound to the second service instance. The service communication proxy obtains the address information of the second service instance, for example, the IP address or the FQDN, based on the identifier of the second service instance. The service communication proxy sends the second message to the second service instance based on the address information of the second service instance.

Step 1340: If the URI in the first message includes the address of the second service instance, but the service communication proxy selects the third service instance in step 1320, after selecting the third service instance, the service communication proxy keeps the message body of the first message unchanged, to obtain the third message. The third message may include an address of the third service instance. A URI in the third message may include the address of the third service instance. For example, the service communication proxy may replace the address of the second service instance in the authorized domain (Authority) field in the URI in the first message with the address of the third service instance, to obtain the third message.

If the selection parameter in the first message includes the identifier of the second service instance, the service communication proxy may delete the selection parameter in the first message, to generate the third message. A message body of the third message may be exactly the same as the message body of the first message. The service communication proxy may change the header of the first message, and write the address of the third service instance into the URI in the third message, and then send the third message to the third service instance.

Figure 10:
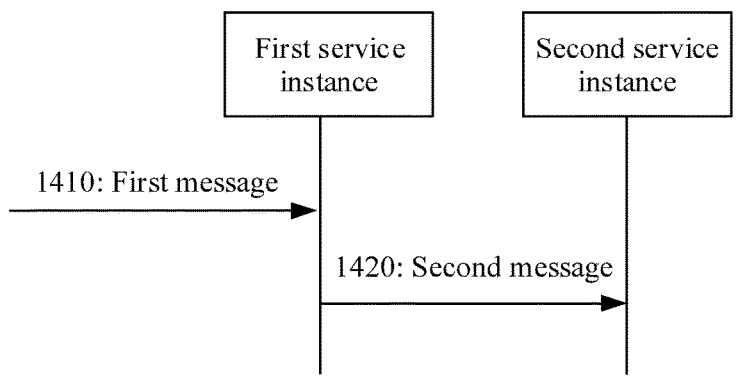
FIG. 10 is a schematic diagram of a communication method according to still another embodiment of this application.

FIG. 10 is a schematic diagram of a communication method according to still another embodiment of this application.

Generally, in an information exchange process, a same service instance provides a service for a session.

For example, during establishment of a session, a second service instance sends an establishment message for a first session to a first service instance, where the establishment message includes an identifier of the second service instance. The first service instance sends another message related to the first session to the second service instance based on the identifier of the second service instance.

In this case, the second service instance sends a first message to the first service instance, where a session identifier in the first message may be used to uniquely identify a session on the second service instance.

However, a service instance that provides a service for the first session may fail, be overloaded, or the like, and affects the session.

To resolve the foregoing problem, an embodiment of this application provides a communication method.

A first service instance may be one of an SMF or a user plane network element (e.g., a UPF). A second service instance may be the other in the SMF or the UPF. A third service instance, a fourth service instance, and the second service instance are network elements having a same function.

Step 1410: The first service instance receives a first message sent by the third service instance or the fourth service instance, where the first message includes a target identifier.

The first service instance determines the second service instance based on the target identifier, and the second service instance is used to provide a service for the first session. In other words, the first service instance determines, based on the target identifier, the second service instance that is to provide a service for the first session.

Step 1420: The first service instance sends a second message to the second service instance.

The first message is related to the first session. The second message is related to the first session. The first message includes an identifier of the first session. The target identifier and the identifier of the first session may be located in a same field or different fields. A session identifier may be used to uniquely identify a session in a target service set. The second service instance, the third service instance, and the fourth service instance may be service instances in the target service set. In other words, each session served by the service set corresponds to one session identifier. When the first service instance is a UPF, and the third service instance and the fourth service instance are SMF instances, a control plane fully qualified stream end point identifier (F-SEID) field in the first message may include the target identifier, or a node identifier (Node ID) in the first message may include the target identifier, or the target identifier may be located in another field in the first message. This is not limited in this embodiment of this application.

The first session is bound to a service instance, or the first session is bound to a service set.

The second service instance, the third service instance, and the fourth service instance are network elements that can provide a same service. For example, both the third service instance and the fourth service instance are AMFs or SMFs.

The second message is related to the first session. The second service instance is used to provide a service for the first session. The second message may be used to request the second service instance to provide a service for the first session.

The first message includes the target identifier. The first session is bound to the third service instance, or is bound to the target service set. The target service set includes the second service instance and the third service instance. The target service set may further include the fourth service instance.

The first session is bound to a service instance. In this case, the service instance provides a service for the first session. When the service instance is unavailable, another service instance in a service set to which the service instance belongs is to provide a service for the first session. If the first session is bound to the third service instance, when the third service instance is unavailable, the first service instance selects the second service instance from the target service set, and sends the second message to the second service instance. Optionally, in an implementation, if the target identifier includes an identifier of the service instance, the first session is bound to the service instance.

The first session is bound to a service set. In this case, a service instance in the service set provides a service for the first session. The first service instance determines that a service instance in the service set is to provide a service for the first session. The first service instance determines the service instance from the service set.

In an implementation, each service instance in the target service set can provide a service for the first session. For example, before step 1410, the third service instance provides a service for the first session, and another service instance in the target service set can obtain a context that is of the first session and that is stored by the third service instance, to provide a service for the first session.

Optionally, the target identifier may include an identifier of a first session group. The identifier of the first session group is used to identify the session group. The first session group includes one or more sessions in a service set. The first session group includes the first session.

An identifier of a session group may be used to identify a unique session group in a service set. The first service instance may determine the second service instance from the target service set based on the identifier of the first session group and an identifier of the target service set.

An identifier of a session group may alternatively be used to identify a unique session group in the service set that communicates with the first service instance. The first service instance may determine the second service instance from the target service set based on the identifier of the first session group.

In other words, the identifier of the session group may be a global identifier, or may be an identifier in the service set.

A session may be classified into a session group through configuration. For example, when establishment of the first session is requested, a service instance (for example, the third service instance) that sends a session establishment request or a service instance that sends a session modification request may configure the first session as a session in the first session group.

If the target identifier includes a plurality of identifiers in the identifier of the session group, an identifier of the third service instance, and the identifier of the target service set, the plurality of identifiers may be encoded as one unified identifier. For example, the plurality of identifiers are encoded as one FQDN, and the unified identifier FQDN is used as the target identifier. Alternatively, the plurality of identifiers may be respectively located in different fields in the first message. This is not limited in this embodiment of this application.

Optionally, the first message includes binding manner indication information. The binding manner indication information is used to indicate that the first session is bound to a service instance or that the first session is bound to a service set.

Optionally, the binding manner indication information may be used as a new parameter in the first message. To be more specific, the binding indication information may be located in a newly added field in the first message. For example, when a session is created, the third service instance adds an optional field to a create session request to send the binding manner indication information. One or more fields of new data types may be defined. The one or more fields of new data types are used to carry the binding manner indication information. The binding manner indication information may alternatively be located in an existing field in the first message.

Alternatively, a binding manner may be implicitly indicated. When the target identifier includes the identifier of the third service instance, it indicates that the binding manner is that the first session is bound to the third service instance. When the target identifier does not include an identifier of a service instance, for example, the target identifier includes only the identifier of the target service set, or the target identifier includes the identifier of the service set and the identifier of the first session group, or the target identifier includes the identifier of the first session group, it indicates that the binding manner is that the first session is bound to a service set.

Optionally, the target identifier may include the identifier of the target service set. The identifier of the service set may be located in a fully qualified stream endpoint identifier (F-SEID). Optionally, the identifier of the service set may be further used as a new parameter in the first message. For example, when a session is created, the second service instance adds an optional field to a create session request to send the identifier of the service set. One or more fields of new data types may be defined. The one or more fields of new data types are used to carry the identifier of the service set. This is not limited in this embodiment.

Optionally, before step 1410, the first service instance may send capability indication information to one or more service instances in the target service set, for example, the third or fourth service instance or each service instance.

A service instance in the target service set, for example, the second service instance, may determine, based on the capability indication information, whether the first service instance supports load balancing that is based on the service set, to be more specific, whether the first service instance supports selection of a service instance from the service set to provide a service for the first session.

The third service instance or the fourth service instance receives the capability indication information sent by the first service instance. If the capability indication information indicates that the first service instance supports the load balancing that is based on the service set, the first message sent by the third service instance or the fourth service instance may include binding relationship indication information. The binding relationship indication information indicates that the first session is bound to a service set. Alternatively, the first message implicitly indicates that the first session is bound to a service set. For example, the first service instance is a UPF, the second service instance, the third service instance, and the fourth service instance are SMFs, and the capability indication information is used to indicate that the UPF supports load balancing that is based on an SMF set.

In some embodiments, when supporting the load balancing that is based on the service set, the first service instance may send the capability indication information to all or some service instances in the target service set, for example, a service instance that communicates with the first service instance, where the capability indication information is used to indicate that the first service instance supports the load balancing that is based on the service set. When the first service instance does not support the load balancing that is based on the service set, the first service instance does not send the capability indication information. For example, if the UPF does not support the foregoing capability, the UPF may not send the capability indication information.

If an instance in the target service set, for example, the second service instance, does not receive the capability indication information of the first service instance, the instance in the target service set determines that the first service instance does not support the load balancing that is based on the service set.

In other words, the instance in the target service set determines, based on whether the capability indication information is received, whether the first service instance supports selection of a service instance from the service set.

In some other embodiments, if an instance in the target service set, for example, the third service instance, receives the capability indication information of the first service instance, where the capability indication information is used to indicate whether the first service instance supports the load balancing that is based on the service set, the instance in the target service set, for example, the third service instance, determines, based on content of the capability indication information, whether the first service instance supports the load balancing that is based on the service set.

If the first service instance does not support selection of another service instance from the service set to which the third service instance belongs, the first message that is related to the first session and that is sent by the third service instance or the fourth service instance to the first service instance includes the identifier of the third service instance.

That the first service instance does not support selection of another service instance from the service set to which the third service instance belongs also means that the first service instance can receive only a response message sent by the service instance (that is, the third service instance) to which the first session is bound. For example, the first service instance sends a request message to the third service instance, where the request message includes the identifier of the third service instance, and the first service instance does not support receiving of a response message from a service instance other than the third service instance.

If the first service instance does not support selection of another service instance from the service set, the third service instance or the fourth service instance may set the binding relationship indication information corresponding to the session to bind to a service instance (for example, bind to the third service instance). The third service instance or the fourth service instance may send the binding relationship indication information to another control plane service instance, such that the other control plane service instance sends a message related to the session to the third service instance. This avoids a case in which message redirection is performed for a relatively large quantity of times between the third service instance and the fourth service instance because the first service instance selects the third service instance but the other control plane service instance selects another service instance, for example, the fourth service instance.

For example, during information exchange between the third service instance, e.g., an SMF 1, and the first service instance, e.g., the UPF, because the UPF does not support selection of an SMF 2 from an SMF set to provide a service for a session corresponding to a user equipment, if the SMF 1 sets binding relationship indication information to bind to an SMF set, where the binding relationship indication information corresponds to the session, when an uplink message related to the session (for example, the user equipment initiates session modification, and in this case, an AMF sends a corresponding uplink message) and a downlink message related to the session (for example, the UPF receives downlink data and triggers paging, and in this case, the UPF sends a corresponding downlink message) are simultaneously triggered, if the AMF that sends the uplink message selects the SMF 2, and the UPF sends the downlink message to the SMF 1, the downlink message sent by the UPF needs to be sent to the SMF 2 for processing by the SMF 2. However, the UPF does not support receiving of a response message from the SMF 2. Consequently, the UPF considers that the UPF cannot send the downlink message to the SMF. In this case, if the SMF 1 determines, based on that the UPF does not support selection of a service instance from the service set, that the session is bound to the SMF 1, and indicates, in a message to be sent to the AMF, that the session is bound to the SMF 1, the AMF selects the SMF 1 when sending the uplink message, but does not select the SMF 2, to avoid the foregoing problem.

When the first service instance does not support the load balancing that is based on the service set, if the third service instance is unavailable, the second service instance sends a session update message to the first service instance. The session update message is used to indicate, to the first service instance, that a service instance providing a service for the first session is changed from the third service instance to the second service instance. The session update message includes the identifier of the second service instance.

For example, the second service instance, e.g., the SMF 1, exchanges information with the first service instance, e.g., the UPF. The UPF does not support selection of the SMF 2 from the SMF set to provide a service for the session corresponding to the user equipment. If the SMF 1 is unavailable, and the SMF 2 subsequently provides a service for the first session, the SMF 2 sends a session update message to the UPF, to indicate the UPF to determine that the service instance providing a service for the first session is changed from the SMF 1 to the SMF 2. In an implementation, when the SMF 2 determines that the SMF 1 is unavailable, the SMF 2 sends session update messages to UPFs corresponding to all sessions for which the SMF 1 provides services, or sends session update messages to UPFs corresponding to all sessions for which the SMF 1 provides services and the SMF 2 provides backups.

Optionally, the first service instance may alternatively register, with an NRF, whether the first service instance has a capability of supporting selection of a service instance from the service set, such that the second service instance obtains, from the NRF, whether the first service instance supports the load balancing that is based on the service set. The second service instance may receive the capability indication information sent by the NRF. The capability indication information indicates whether the first service instance supports selection of a service instance from the service set, in other words, whether the first service instance has a capability of selecting a service instance from the service set.

In other words, the third service instance may receive the capability indication information sent by the first service instance, or receive the capability indication information sent by the NRF. The capability indication information indicates whether the first service instance supports selection of a service instance from the service set.

Optionally, the third service instance may alternatively determine, based on a capability of the third service instance and/or an attribute of the session, the binding indication information corresponding to the first session. If the third service instance does not support load balancing that is based on the service set, or in some cases, does not support load balancing that is based on the service set, the first session is bound to the third service instance. For example, if the third service instance supports communication with a fourth generation (4G) mobile communications system, the third service instance sets the binding indication information to bind to a service instance (namely, bind to the third service instance), where the binding indication information corresponds to a session for which the third service instance provides a service. Alternatively, the third service instance determines, based on whether the session supports migration to a Long-Term Evolution (LTE) system, the binding indication information corresponding to the session. For example, if the session supports migration to the LTE system, the third service instance sets the binding indication information to bind to a service instance, where the binding indication information corresponds to the session.

The third service instance may determine, based on the capability indication information of the first service instance, the binding manner corresponding to the session. The third service instance may determine the binding manner indication information based on the capability indication information of the first service instance.

The binding manner indication information may further indicate that the session is bound to the third service instance or bound to the service set to which the third service instance belongs.

If the first service instance does not support selection of a service instance from the service set, the binding manner indication information indicates that the session is bound to the third service instance.

If the first service instance has the capability of supporting selection of a service instance from the service set, the binding manner indication information may indicate that the first session for which the first service instance is required to provide a service is bound to the third service instance or bound to the service set including the third service instance. The service set including the third service instance is the service set to which the third service instance belongs.

Alternatively, the third service instance may determine, based on the capability of the third service instance and/or the attribute of the session, the binding manner corresponding to the session.

The third service instance does not support selection of a service instance from the service set, or the third service instance determines that the session for which the third service instance is required to provide a service is bound to the third service instance. For example, if the third service instance supports the LTE system, when the third service instance provides a service via the LTE system, because the LTE system does not support selection of a service instance from the service set, the third service instance does not support selection of a service instance from the service set. Therefore, that the third service instance supports the LTE system may be considered that the third service instance does not support selection of a service instance from the service set.

If the first session supports a service instance to provide a service via the LTE system, when the first session is provided with a service by the service instance via the LTE system, in other words, when the first session is migrated to the LTE system, where the LTE system does not support selection of a service instance from the service set, the service instance that provides a service for the first session cannot select a service instance from the service set. Therefore, that the first session supports a service instance to provide a service via the LTE system may be considered that the third service instance does not support selection of a service instance from the service set. The third service instance may determine, based on the attribute of the session, the binding manner indication information corresponding to the session.

The third service instance or the fourth service instance may send the binding relationship indication information to another control plane service instance, such that the other control plane service instance sends a message related to the session to the third service instance. This avoids a case in which message redirection is performed for a relatively large quantity of times between the third service instance and the fourth service instance because the first service instance selects the third service instance but the other control plane service instance selects another service instance, for example, the fourth service instance.

The first session is bound to the third service instance. If the third service instance is unavailable, the first service instance selects the second service instance. The first service instance may determine the identifier of the target service set, and select the second service instance from the target service set. The first service instance determines the identifier of the target service set based on the target identifier. In an implementation, the target identifier includes the identifier of the target service set, and the first service instance obtains the identifier of the target service set from the target identifier. In another implementation, the target identifier includes the identifier of the third service instance, and the first service instance determines the identifier of the target service set based on the identifier of the third service instance and a correspondence that is between the identifier of the target service set and the identifier of the third service instance and that is received from the service instance in the target service set.

The first service instance may send the identifier of the target service set to the NRF, and the NRF sends identifiers of available service instances in the target service set to the first service instance. The first service instance selects the second service instance from the available service instances in the target service set.

The NRF network element may store a correspondence between a service set and one or more service instances.

The first service instance may send the identifier of the target service set to the NRF network element. The NRF network element may determine one service instance in the target service set as the second service instance based on the identifier of the target service set and a correspondence between the target service set and one or more service instances. The second service instance is an available service instance.

If the third service instance is unavailable, the first service instance may send the identifier of the third service instance to the NRF network element, and the NRF network element may determine, based on the identifier of the third service instance, the target service set to which the third service instance belongs. The NRF network element may determine available service instances in the target service set based on the identifier of the target service set. The available service instances include the second service instance.

If the target identifier includes the identifier of the first session group, the first service instance receives the identifier of the first session group, and the first service instance may determine the second service instance based on the identifier of the first session group. There is a correspondence between the first session group and the second service instance. To be more specific, the second service instance provides a service for a session in the first session group. The first service instance may further determine the second service instance based on the identifier of the first session group and the identifier of the target service set.

The first service instance may store the correspondence between the first session group and the second service instance. The first service instance may determine the second service instance based on the identifier of the first session group and the correspondence between the first session group and the second service instance.

The NRF network element may store the correspondence between the first session group and the second service instance. To be more specific, the second service instance provides a service for a session in the first session group. The first service instance may send the identifier of the first session group to the NRF network element. The NRF network element may determine the second service instance based on the correspondence between the first session group and the second service instance. The NRF network element may send the identifier of the second service instance to the first service instance. In other words, the first service instance sends the identifier of the first session group to the NRF network element; and the first service instance receives the identifier of the second service instance that is sent by the NRF network element, to determine the second service instance.

Further, if the first service instance receives the identifier of the first session group and the identifier of the target service set, the first service instance sends the identifier of the first session group and the identifier of the target service set to the NRF network element. As such, the NRF selects, from the target service set based on the identifier of the first session group, the second service instance corresponding to the first session group.

In another implementation, the first service instance may alternatively select the second service instance based on a locally obtained mapping relationship between the target service set and a service instance.

The first service instance may store a correspondence between a service set and one or more service instances. The first service instance may determine one service instance in the target service set as the second service instance based on the identifier of the target service set and a correspondence between the target service set and one or more service instances. The target service set includes the one or more service instances.

Optionally, before step 1410, the first service instance may receive first information sent by a service instance in the target service set, where the first information includes an identifier of the service instance and the identifier of the target service set, and the first information may indicate a correspondence between the service instance and the target service set. The first service instance obtains the identifier of the target service set based on the target identifier. The first service instance determines the second service instance based on the identifier of the target service set. In other words, the first service instance may determine the second service instance based on the identifier of the target service set and the correspondence between the service instance and the target service set.

The first service instance may receive the identifier of the target service set and the identifier of the service instance that are sent by the service instance in the target service set. To be more specific, the first service instance may determine the correspondence between the target service set and the service instance based on a received message; and the first service instance may determine the second service instance from the target service set based on the obtained identifier of the target service set.

The first service instance may receive identifiers, sent by one service instance in a service set, of all or some service instances in the service set to which the service instance belongs, and an identifier of the service set. To be more specific, the first information may include the identifier of the target service set and identifiers of a plurality of service instances. The plurality of service instances are all or some service instances in the target service set.

Optionally, when the plurality of service instances are some service instances in the target service set, the first service instance may receive first information sent by the plurality of service instances, to obtain an identifier of each service instance in the target service set. The first service instance may determine a correspondence between each of the plurality of service instances in the service set and the service set based on the first information sent by each of the plurality of service instances.

Alternatively, the first service instance may receive first information sent by each service instance in one service set, where the first information includes an identifier of the service instance and an identifier of the service set. The first service instance may obtain a correspondence between each service instance in the service set and the service set based on the first information sent by each service instance in the service set.

The first service instance may receive an identifier of each of one or more service instances in the target service set and the identifier of the target service set to which the one or more service instances belong, where the identifier of each of one or more service instances in the target service set and the identifier of the target service set are sent by the service instance. The plurality of service instances include the second service instance. The first service instance may store a correspondence between the target service set and the one or more service instances. When one service instance belongs to a plurality of service sets, the first service instance receives an identifier of the service instance and identifiers of the plurality of service sets to which the service instance belongs.

It should be understood that the first service instance may receive, from, each of one or more service instances in a service set, an identifier of the service set and an identifier of the service instance. To be more specific, each service instance in the target service set sends an identifier of the service instance and the identifier of the target service set to the first service instance. The first service instance receives an identifier of a first service set and the identifier of the second service instance that are sent by the second service instance, where the first service set includes the second service instance. The first service instance receives the identifier of the first service set and the identifier of the third service instance that are sent by the third service instance, where the first service set includes the third service instance. The first service set may be the target service set.

The first service instance may determine a correspondence between each service instance and the service set based on the received identifier of each service instance and the identifier of the service set to which the service instance belongs, to determine a service instance in the service set. The first service instance determines the second service instance from the target service set based on the correspondence between the service instance and the service set and the target service set to which the third service instance belongs, and sends the second message to the second service instance. The second service instance is used to provide a service for the first session. The third service instance sends, to the first service instance using the first message, the identifier of the target service set to which the third service instance belongs. Alternatively, the first service instance determines, based on the identifier of the third service instance in the target identifier and the received correspondence between the third service instance and the service set, the target service set corresponding to the third service instance.

For example, when the first service instance establishes an inter-network element link with a service instance in the service set to which the second service instance belongs, the service instance in the service set to which the second service instance belongs sends the identifier of the service set to which the second service instance belongs and an identifier of the service instance to the first service instance. For example, when establishing an inter-network element link with the first service instance, the second service instance sends the identifier of the service set to which the second service instance belongs and the identifier of the second service instance to the first service instance. In this way, the first service instance may establish a mapping relationship between the set and all service instances included in the set. For example, an SMF set includes an SMF 1, an SMF 2, and an SMF 3. When establishing an N4 link with a UPF, the SMF 1 sends an identifier of the SMF set and an identifier of the SMF 1 to the UPF. When establishing an N4 link with the UPF, the SMF 2 sends the identifier of the SMF set and an identifier of the SMF 2 to the UPF. When establishing an N4 link with the UPF, the SMF 3 sends the identifier of the SMF set and an identifier of the SMF 3 to the UPF. In this way, the UPF may establish the following association: (the identifier of the SMF set, the identifier of the SMF 1, the identifier of the SMF 2, the identifier of the SMF 3). To be more specific, the UPF establishes mapping relationships between the identifier of the SMF set and the SMF 1, between the identifier of the SMF set and the SMF 2, and between the identifier of the SMF set and the SMF 3. When the SMF 1 fails, the UPF may select, from the SMF set based on the identifier of the SMF set, the SMF 2 or the SMF 3 as the second service instance to provide a service for the first session. The UPF may determine, based on the identifier of the SMF 1, the identifier of the SMF set corresponding to the SMF 1, and select the SMF 2 or the SMF 3 from the SMF set as the second service instance.

When establishing an inter-network element link with each service instance, the first service instance may obtain, from the service instance, an identifier of a service set to which the service instance belongs and an identifier of the service instance. For example, when the first service instance is a UPF, and the target service set is an SMF set, establishment of an inter-network element link means establishment (setup) of an N4 association.

When the first service instance obtains the identifier of the target service set corresponding to the first session during establishment of the session, the target service set is the service set to which the second service instance belongs. The first service instance obtains one or more identifiers of one or more service instances included in the target service set. The first service instance may select one service instance in the target service set as the second service instance to provide a service for the first session.

During registration of the service instance, the service instance may also register the identifier of the target service set to which the service instance belongs with the NRF network element. Each service instance in the target service set may send the identifier of the service instance and the identifier of the target service set to the NRF network element. The NRF network element determines the correspondence between the target service set and each service instance based on the identifier of the service instance and the identifier of the target service set that are sent by the service instance. To be more specific, the NRF network element determines a service instance included in the target service set.

The first service instance sends the identifier of the target service set to the NRF network element. The NRF network element determines one service instance in the target service set as the second service instance based on the correspondence between the target service set and the service instance. The NRF network element sends the identifier of the second service instance to the first service instance.

The first service instance may obtain the identifier of the target service set based on the target identifier.

The first service instance may obtain the identifier of the target service set from the target identifier in the first message. To be more specific, the target identifier includes the identifier of the target service set, and the first service instance may obtain the identifier of the target service set.

When the target identifier includes the identifier of the third service instance, the first service instance may obtain the identifier of the target service set based on the identifier of the third service instance. The first service instance may determine the identifier of the target service set based on the identifier of the third service instance and the correspondence that is between the identifier of the third service instance and the identifier of the target service set and that may be received by the first service instance from a service instance in the target service set, for example, sent by the third service instance to the first service instance during establishment of an N4 association, or sent by another service instance in the target service set to the first service instance.

For example, in a process in which the third service instance establishes an inter-network element link with the first service instance, the third service instance sends the identifier of the target service set and the identifier of the third service instance to the first service instance. Alternatively, the first service instance sends the identifier of the third service instance to the NRF network element, and the NRF network element sends the identifier of the target service set to the first service instance.

Optionally, the first service instance sends the identifier of the third service instance to the NRF network element, and the NRF network element determines the target service set corresponding to the third service instance.

In one service set, one or more service instances may provide a backup for another service instance.

Optionally, before step 1410, the first service instance receives a third message sent by the second service instance or the third service instance.

The third message may include backup indication information, and the backup indication information is used to indicate that the second service instance is a service instance used to provide a backup for the third service instance. Alternatively, the third message may indicate that the second service instance is a service instance used to provide a backup for the first session group for which the third service instance provides a service. In other words, the second service instance provides a backup for the third service instance, or the second service instance provides a backup for the first session group for which the third service instance provides a service. When the third service instance is unavailable, the first service instance determines, based on the backup indication information and the target identifier, that the second service instance is to provide a service for the first session.

For example, a service instance 1 sends a third message to the first service instance. The third message is used to indicate that a service instance 2 is a service instance used to provide a backup for the service instance 1. The third message may include an identifier of the service instance 1 and an identifier of the service instance 2. At a first moment, the service instance 1 provides a service for a first session, and the service instance 2 provides a backup for the first session.

When the service instance 1 is unavailable, the first service instance determines the service instance 2 as the second service instance, and sends a second message to the service instance 1. In other words, the service instance 2 provides a service for the first session at a second moment.

In this case, sessions for which the service instance 2 provides a backup may be all sessions for which the service instance 1 provides a service.

When a service instance providing a service for a session is unavailable, a service instance providing a backup for the session starts to provide a service for the session. The service instance providing a backup for the session does not need to obtain a context of the session from another network element. This reduces a delay.

A service instance 1 sends a third message to the first service instance. The third message is used to indicate that a service instance 2 is a service instance used to provide a backup for a first session group corresponding to the service instance service 1. The third message may include an identifier of the service instance 1, an identifier of the service instance 2, and the identifier of the first session group. The first session group includes the first session. At a first moment, the service instance 1 provides a service for the first session group, and the service instance 2 provides a backup for the first session group. In other words, the service instance 2 may be associated with a session group for which the second service instance 1 provides a service. In an implementation, the third message is an inter-network element link message. For example, when the first service instance is a UPF, and the target service set is an SMF set, the third message is an N4 association establishment or update message.

In another implementation, the third service instance may send an identifier of a backup service instance to the first service instance using the first message. When the third service instance is unavailable, the first service instance determines, based on the identifier of the backup service instance in the first message, that the backup service instance is the second service instance. The first service instance sends the second message to the second service instance. The identifier of the backup service instance may be an IP address of the backup service instance.

The first message may include one or more identifiers of one or more backup service instances corresponding to the third service instance. The target service set may include the one or more backup service instances. To be more specific, a backup service instance corresponding to an identifier of each backup service instance may be understood as a service instance in the service set to which the third service instance belongs. In other words, the target service set includes the one or more backup service instances and the third service instance. The first message may include one or more identifiers of the one or more backup service instances. To be more specific, the first message may include one or more identifiers of the one or more service instances in the target service set.

Optionally, the backup service instance is associated with a group of sessions for which the second service instance provides a service, or is associated with all sessions for which the second service instance provides a service. When the backup service instance is associated with the group of sessions, the first message may further include identifiers of the group of sessions associated with the backup service instance.

Optionally, before step 1410, the first service instance may further receive an identifier that is of each service instance in the target service set and that is sent by the service instance, an identifier of a session group for which the service instance provides a service, and an identifier of a session group for which the service instance provides a backup.

The first service instance may determine, based on the session group to which the first session belongs, that a service instance that provides a backup for the session group is the second service instance.

For example, when a service instance in a service set registers with the NRF, the service instance may further carry one or more identifiers of one or more session groups for which the service instance provides a backup service. For example, a service instance 1 provides a service for a session group 1, and provides a backup for a session group 2. In this case, a message sent by the service instance 1 to the first service instance includes an identifier of a set corresponding to the service instance 1, an identifier of the service instance 1, an identifier of the session group 1 for which the service instance 1 provides a service, and an identifier of the session group 2 for which the service instance 1 provides a backup. Likewise, a service instance 2 provides a service for the session group 2, and provides a backup for the session group 1. In this case, a message sent by the service instance 2 to the first service instance includes an identifier of a set corresponding to the service instance 2, an identifier of the service instance 2, the identifier of the session group 2 for which the service instance 2 provides a service, and the identifier of the session group 1 for which the service instance 2 provides a backup. In this case, the first service instance determines the second service instance based on the target service set and an identifier of a session group corresponding to a session. For example, the session group corresponds to the session group 1, and when the service instance 1 is unavailable, the first service instance determines, based on the identifier of the session group 1, that the service instance 2 provides a backup for the session group, and therefore selects the service instance 2 as the second service instance.

Optionally, during registration of a service instance, the service instance may alternatively register, with the NRF network element, an identifier of a target service set to which the service instance belongs and an identifier of a session group for which the service instance provides a backup.

The first service instance sends the identifier of the first session group to the NRF. The NRF determines, based on the identifier of the first session group, the identifier of the second service instance that provides a backup for the first session group. The NRF may send the identifier of the second service instance to the first service instance.

The second message may include a message body, where the message body includes a parameter related to the first session. The second message may be used to indicate the second service instance to provide a service for the first session.

The second message may be a request message sent by the first service instance to the second service instance. For example, the first service instance is a UPF network element, the second service instance is an SMF network element. The second message may be used by the first service instance to send a downlink data notification to the second service instance.

The second message may include the identifier of the second service instance.

The identifier of the second service instance may be located in a fully qualified stream endpoint identifier (F-SEID) field in the second message.

Alternatively, the target identifier may be used as a new parameter. For example, when a session is created, the second service instance adds an optional field to a create session request to send the target identifier. One or more fields of new data types may be defined. The one or more fields of new data types are used to carry the target identifier. A plurality of identifiers included in the target identifier may be carried in a same field or different fields.

For example, the F-SEID field in the first message includes the identifier of the service instance 1, and the identifier of the service instance 1 may be, for example, an IP address of the service instance 1. If the service instance 1 is unavailable, the first service instance determines the service instance 2 as the second service instance. The F-SEID field in the second message may include the identifier of the service instance 2. The F-SEID field in the second message does not include the identifier of the service instance 1.

If the first service instance is a UPF, the second message may include an identifier of the first session. The identifier that is of the first session and that is in the second message is determined based on the identifier that is of the first session and that is in the first message. For example, the identifier that is of the first session and that is in the second message is the same as the identifier that is of the first session and that is in the first message. An identifier of a session may be used to identify the session in a service set.

An embodiment of this application provides a communication method. The communication method includes: A third service instance sends a first message related to a first session to a first service instance, where the first message includes a target identifier, the target identifier is used to indicate the first service instance to determine a second service instance, and the second service instance is used to provide a service for the first session.

Optionally, the first message includes binding manner indication information, the binding manner indication information is used to indicate to bind the first session to the third service instance or bind the first session to a target service set, and the target service set includes the second service instance and the third service instance.

Optionally, the target identifier includes an identifier of the third service instance.

Optionally, the third service instance receives capability indication information sent by the first service instance or an NRF network element. The capability indication information is used to indicate that the first service instance supports load balancing that is based on a target service set, and the target service set includes the second service instance and the third service instance.

Optionally, the third service instance sends an identifier of the target service set and an identifier of the third service instance to the first service instance, where the target service set includes the second service instance and the third service instance.

Optionally, the third service instance sends backup indication information to the first service instance, where the backup indication information is used to indicate the second service instance to provide a backup for the third service instance or provide a backup for a first session group for which the second service instance provides a service, and the first session group includes the first session.

Figure 11:
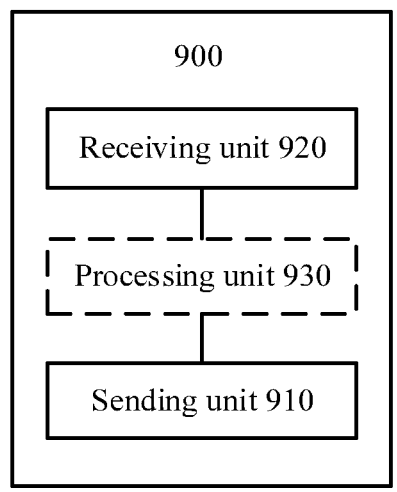
FIG. 11 is a schematic structural diagram of a service communication proxy according to an embodiment of this application.

FIG. 11 is a schematic structural diagram of a service communication proxy 900 according to an embodiment of this application. The service communication proxy 900 in FIG. 11 may be configured to perform the steps performed by the service communication proxy in the methods in FIG. 3 to FIG. 8. The service communication proxy 900 includes a sending unit 910 and a receiving unit 920. Optionally, the service communication proxy 900 may further include a processing unit 930. The following describes in detail functions of the modules of the service communication proxy 900.

The receiving unit 920 is configured to receive a first message sent by a first service instance, where the first message includes a target identifier. The sending unit 910 is configured to send, based on the first message, a second message to a second service instance that has a binding relationship with the target identifier.

Optionally, the processing unit 930 is configured to: when there is no service instance that has a binding relationship with the target identifier, obtain an identifier of a target service set based on the first message. The processing unit 930 is further configured to select a third service instance from the target service set based on the identifier of the target service set. The sending unit 910 is further configured to send a third message to the third service instance based on the first message.

Optionally, the processing unit 930 is further configured to obtain the identifier of the target service set from the first message, where the first message further includes the identifier of the target service set. Alternatively, the processing unit 930 is further configured to obtain the identifier of the target service set from the target identifier in the first message, where the target identifier includes the identifier of the target service set. Alternatively, the processing unit 930 is further configured to determine an identifier of a service set as the identifier of the target service set, where the identifier of the service set has a mapping relationship with the target identifier in the first message.

Optionally, the receiving unit 920 is further configured to receive a fourth message sent by the second service instance, and the processing unit 930 is further configured to establish the binding relationship between the target identifier and the second service instance based on the first message.

Optionally, the fourth message is a message related to a user equipment, or the fourth message is a dedicated binding request message.

Optionally, the fourth message carries at least one of a binding indication or a binding timer. The binding timer is used to release the binding relationship between the target identifier and the second service instance after the binding timer expires.

Optionally, the fourth message carries the target identifier.

Optionally, the processing unit 930 is further configured to assign the target identifier after the fourth message sent by the second service instance is received.

Optionally, the processing unit 930 is further configured to add the target identifier to the fourth message when the fourth message is the message related to the user equipment.

Optionally, the receiving unit 920 is further configured to: receive an unbinding request sent by the second service instance, where the unbinding request is used to request to release the binding relationship between the target identifier and the second service instance; or start the binding timer, and release the binding relationship between the target identifier and the second service instance after the binding timer expires.

Optionally, the target identifier is related to one user equipment or a group of user equipments.

Optionally, the target identifier is one of service pointers configured for the second service instance. The receiving unit 920 is further configured to receive a registration request from the second service instance. The sending unit 910 is further configured to send a registration response to the second service instance, where the registration response includes a service pointer configured for the second service instance.

Optionally, the registration request includes a quantity of service pointers that are applied for by the second service instance. The processing unit 930 is further configured to configure the service pointer for the second service instance based on the quantity of service pointers that are applied for by the second service instance.

Optionally, the processing unit 930 is further configured to configure the service pointer for the second service instance based on a capacity of the second service instance.

Optionally, the processing unit 930 is further configured to determine a service set to which the second service instance belongs. The processing unit 930 is further configured to configure the service pointer for the second service instance, such that the service pointer corresponding to the second service instance is different from a service pointer corresponding to another service instance in the service set.

Optionally, the target identifier is one of service pointers configured for the second service instance. The receiving unit 920 is further configured to receive a registration request from the second service instance, where the registration request includes a service pointer corresponding to the second service instance, such that the service communication proxy binds the second service instance to the service pointer.

Optionally, the processing unit 930 is further configured to: when the service pointer corresponding to the second service instance conflicts with a service pointer corresponding to another service instance in the service set to which the second service instance belongs, reconfigure a service pointer for the second service instance. The sending unit 910 is further configured to send a registration response to the second service instance, where the registration response includes the service pointer reconfigured for the second service instance.

Optionally, the first message is a hypertext transfer protocol (HTTP) message, and the target identifier is located in a header of the HTTP message.

Figure 12:
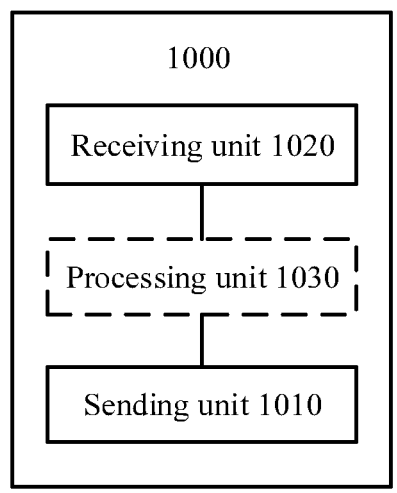
FIG. 12 is a schematic structural diagram of a service instance according to an embodiment of this application.

FIG. 12 is a schematic structural diagram of a service instance 1000 according to an embodiment of this application. The service instance 1000 in FIG. 12 may be configured to perform the steps performed by the second service instance in the methods in FIG. 3 to FIG. 8. The service instance 1000 includes a sending unit 1010 and a receiving unit 1020. Optionally, the service instance 1000 in FIG. 12 may further include a processing unit 1030. The following describes in detail functions of the modules of the service instance 1000.

The sending unit 1010 is configured to send a fourth message to a service communication proxy, where the fourth message is used to trigger the service communication proxy to establish a binding relationship between the second service instance and a target identifier, and the target identifier is related to a user equipment. The receiving unit 1020 is configured to receive a second message sent by the service communication proxy, where the second message includes the target identifier.

Optionally, the fourth message is a message related to the user equipment, or the fourth message is a dedicated binding request.

Optionally, the fourth message includes at least one of the target identifier or a binding timer.

Optionally, the sending unit 1010 is further configured to send the target identifier to a first service instance.

Optionally, the processing unit is further configured to insert the target identifier in the fourth message, to send the target identifier to the first service instance.

Optionally, the sending unit 1010 is further configured to send an unbinding request to the service communication proxy. The unbinding request is used to request to release the binding relationship between the target identifier and the second service instance.

Optionally, the target identifier is related to one user equipment or a group of user equipments.

Optionally, the target identifier is one of service pointers configured for the second service instance. The sending unit 1010 is further configured to send a registration request to the service communication proxy. The receiving unit 1020 is further configured to receive a registration response sent by the service communication proxy, where the registration response includes a service pointer configured for the second service instance.

Optionally, the registration request includes a quantity of service pointers that are applied for by the second service instance.

Optionally, the sending unit 1010 is further configured to send a registration request to the service communication proxy, where the registration request includes a service pointer configured by the second service instance for the second service instance.

Optionally, the first message is an HTTP message, and the target identifier is located in a header of the HTTP message.

Optionally, the service instance 1000 may further include the processing unit 1030. The processing unit is configured to process a message received by the receiving unit 1010.

The service instance 1000 may further perform the steps performed by the first service instance in the methods in FIG. 3 to FIG. 8. The receiving unit 1020 of the service instance 1000 is configured to receive the target identifier that is related to the user equipment and the second service instance. The sending unit 1010 adds the target identifier to a message that is related to the user equipment and the second service instance and then sends the message, where the target identifier is used to send the message to the second service instance.

Optionally, the receiving unit 1020 is configured to receive the target identifier.

Optionally, the receiving unit is configured to receive the target identifier from the service communication proxy related to the second service instance.

Figure 13:
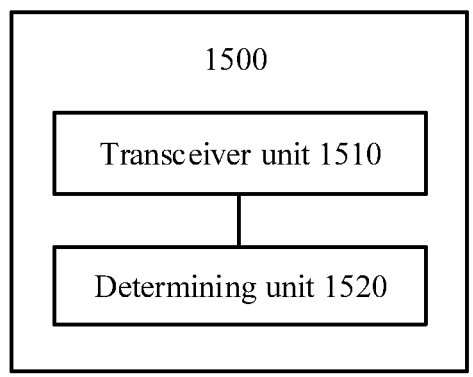
FIG. 13 is a schematic structural diagram of a service communication proxy according to an embodiment of this application.

FIG. 13 is a schematic structural diagram of a service communication proxy 1100 according to another embodiment of this application. The service communication proxy 1100 includes a processor 1110 and a transceiver 1120.

The processor 1110 and the transceiver 1120 communicate with each other through an internal connection circuit. The processor 1110 is configured to execute an instruction, to control the transceiver 1120 to send a signal and/or receive a signal. Optionally, the service communication proxy 1110 may further include a memory 1130. The processor 1110, the transceiver 1120, and the memory 1130 communicate with each other through an internal connection path. The memory 1130 is configured to store an instruction. The processor 1110 is configured to execute the instruction stored in the memory 1130, to control the transceiver 1120 to send a signal and/or receive a signal. It should be understood that the transceiver 1120 may provide same functions as the sending unit 910 and the receiving unit 920 in FIG. 11. The processor 1110 and the memory 1130 may provide same functions as the processing unit 930 in FIG. 11.

The transceiver 1120 is configured to receive a first message sent by a first service instance, where the first message includes a target identifier. The processor 1110 is configured to find whether there is a service instance corresponding to the target identifier. When the processor 1110 finds a second service instance that corresponds to the target identifier, the transceiver 1120 is further configured to send, based on the first message, a second message to the second service instance that has a binding relationship with the target identifier.

Figure 14:
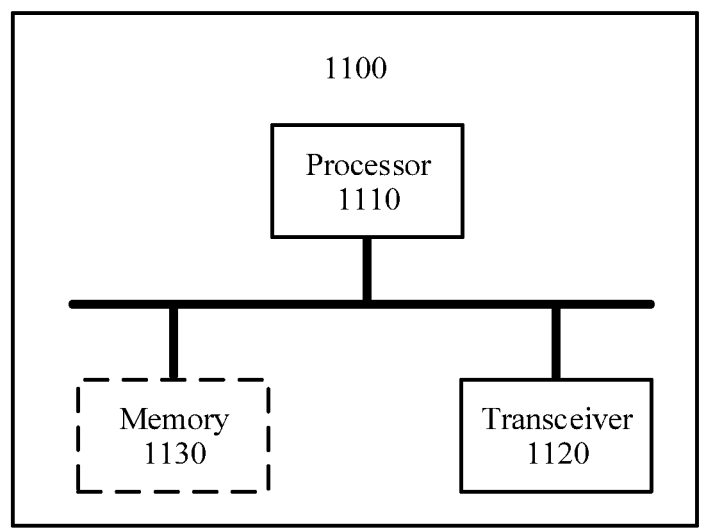
FIG. 14 is a schematic structural diagram of a service instance according to another embodiment of this application.

FIG. 14 is a schematic structural diagram of a service instance 1200 according to another embodiment of this application. The service instance 1200 may perform the steps in the methods in FIG. 3 to FIG. 8. The service instance 1200 includes a transceiver 1220. The transceiver 1220 is configured to receive/send a signal. Optionally, the service instance 1200 may further include a processor 1210. The processor 1210 and the transceiver 1220 communicate with each other through an internal connection path. The processor 1210 is configured to control the transceiver 1220 to send/receive a signal. Optionally, the service instance 1200 may further include a memory 1230. The processor 1210, the transceiver 1220, and the memory 1230 communicate with each other through an internal connection path. The memory 1230 is configured to store an instruction. The processor 1210 is configured to execute the instruction stored in the memory 1230, to control the transceiver 1220 to send a signal and/or receive a signal. It should be understood that the transceiver 1220 may provide same functions as the sending unit 910 and the receiving unit 920 in FIG. 11. The processor 1210 and the memory 1230 may provide same functions as the processing unit 930 in FIG. 11.

The transceiver 1220 is configured to send a fourth message to a service communication proxy, where the fourth message is used to trigger the service communication proxy to establish a binding relationship between the service instance 1200 and a target identifier. The transceiver 1220 is further configured to receive a second message forwarded by the service communication proxy, where the second message includes the target identifier. Optionally, the service instance 1200 may further include the processor 1210. The processor 1210 is configured to execute the instruction.

The service instance 1200 may further perform the steps performed by the first service instance in the methods in FIG. 3 to FIG. 10. The transceiver 1220 of the service instance 1200 is further configured to receive the target identifier that is related to a user equipment and a second service instance. The transceiver 1220 adds the target identifier to a message that is related to the user equipment and the second service instance and then sends the message, where the target identifier is used to send the message to the second service instance. The processor 1210 is configured to execute the instruction.

It should be understood that the transceiver may be a communications interface. The memory may be an independent component, or may be integrated into the processor. Each of the foregoing components or some components may be integrated into a chip for implementation, for example, integrated into a baseband chip for implementation.

Figure 15:
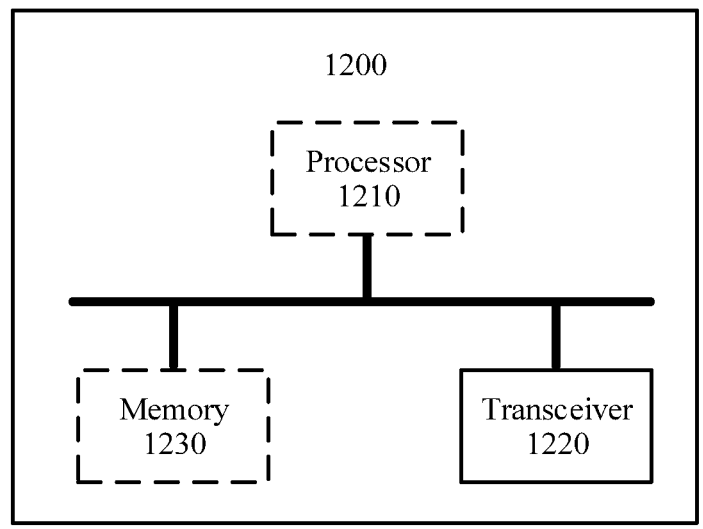
FIG. 15 is a schematic structural diagram of a communications device according to another embodiment of this application.

FIG. 15 is a schematic structural diagram of a communications device 1500 according to an embodiment of this application. The communications device 1500 includes a transceiver unit 1510 and a determining unit 1520.

The transceiver unit 1510 is configured to receive a first message that is related to a first session and that is sent by a third service instance or a fourth service instance, where the first message includes a target identifier.

The determining unit 1520 is configured to determine, based on the target identifier, a second service instance that is to provide a service for the first session.

The transceiver unit 1510 is further configured to send a second message related to the first session to the second service instance.

The communications device determines, based on the target identifier, the service instance that is to provide a service for the first session. This improves flexibility of selecting the service instance, such that the selected service instance that is to provide a service for the first session subsequently may be different from a service instance that previously provides a service for the first session, to avoid interruption caused to the first session because the third service instance fails.

Optionally, the first message includes binding manner indication information. The binding manner indication information is used to indicate to bind the first session to the third service instance or bind the first session to a target service set. The target service set includes the second service instance, the third service instance, and the fourth service instance.

The communications device may determine, based on the binding manner indication information, a manner of selecting the service instance.

Optionally, the target identifier includes an identifier of the third service instance.

Optionally, the transceiver unit 1510 is further configured to receive a third message sent by the third service instance, where the third message includes backup indication information, the backup indication information is used to indicate the second service instance to provide a backup for the third service instance or indicate the second service instance to provide a backup for a first session group for which the third service instance provides a service, and the first session group includes the first session.

The determining unit 1520 is configured to: when the third service instance is unavailable, determine the second service instance based on the backup indication information and the target identifier.

Based on the backup indication information, the communications device may use the service instance that provides a backup for the first session group as a candidate service instance. When the third service instance to which the first session is bound is unavailable, a backup service instance is to provide a service for the first session. This can avoid interruption caused to the first session because the third service instance fails, and improve user experience.

Optionally, the communications device 1500 further includes an obtaining unit. The obtaining unit is configured to obtain an identifier of the target service set based on the target identifier.

The determining unit 1520 is configured to determine the second service instance from the target service set based on the identifier of the target service set, where the target service set includes the second service instance, the third service instance, and the fourth service instance.

Optionally, the transceiver unit 1510 is further configured to send the identifier of the target service set to a network repository function (NRF) network element.

The transceiver unit 1510 is further configured to receive an identifier of the second service instance that is sent by the NRF network element, to determine the second service instance. The target service set includes the second service instance.

The communications device determines, based on the identifier of the service instance that is sent by the NRF network element, that the service instance is to provide a service for the first session. This can lower a requirement for a storage capability and a processing capability of the first service instance.

Optionally, the transceiver unit 1510 is further configured to receive first information sent by a service instance in the target service set, where the first information includes an identifier of the service instance and the identifier of the target service set.

The determining unit 1520 is configured to determine the second service instance based on the identifier of the target service set and the first information.

Optionally, the obtaining unit is configured to obtain the identifier of the target service set from the target identifier, where the target identifier includes the identifier of the target service set.

Optionally, the obtaining unit is configured to: when the target identifier includes the identifier of the third service instance, obtain the identifier of the target service set based on the identifier of the third service instance, where the target service set includes the third service instance.

Optionally, the target identifier includes an identifier of the first session group, and the first session group includes the first session.

The transceiver unit 1510 is further configured to send the identifier of the first session group to the NRF network element.

The transceiver unit 1510 is further configured to receive the identifier of the second service instance that is sent by the NRF network element, to determine the second service instance.

Optionally, the communications device 1500 is a user plane function (UPF) network element, and the second service instance, the third service instance, and the fourth service instance are session management function (SMF) network elements.

Figure 16:
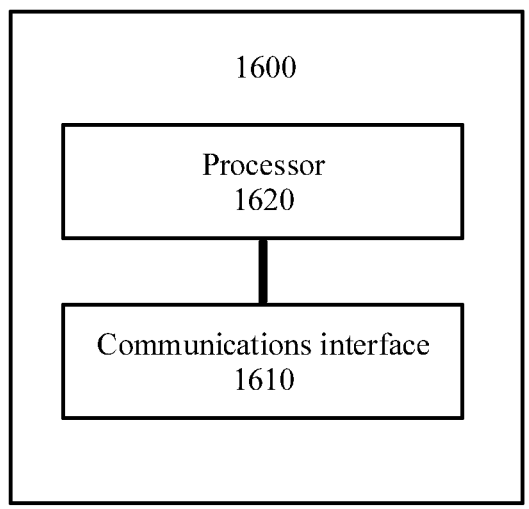
FIG. 16 is a schematic structural diagram of a communications device according to another embodiment of this application.

FIG. 16 is a schematic structural diagram of a communications device 1600 according to an embodiment of this application. The communications device 1600 includes a communications interface 1610 and a processor 1620.

The communications interface 1610 is configured to receive a first message that is related to a first session and that is sent by a third service instance or a fourth service instance, where the first message includes a target identifier.

The processor 1620 is configured to determine, based on the target identifier, a second service instance that is to provide a service for the first session.

The communications interface 1610 is further configured to send a second message related to the first session to the second service instance.

Optionally, the first message includes binding manner indication information. The binding manner indication information is used to indicate to bind the first session to the third service instance or bind the first session to a target service set. The target service set includes the second service instance, the third service instance, and the fourth service instance.

Optionally, the target identifier includes an identifier of the third service instance.

Optionally, the communications interface 1610 is further configured to receive a third message sent by the third service instance, where the third message includes backup indication information, the backup indication information is used to indicate the second service instance to provide a backup for the third service instance or indicate the second service instance to provide a backup for a first session group for which the third service instance provides a service, and the first session group includes the first session.

The processor 1620 is configured to: when the third service instance is unavailable, determine the second service instance based on the backup indication information and the target identifier.

Optionally, the processor 1620 is further configured to obtain an identifier of the target service set based on the target identifier. The processor 1620 is further configured to determine the second service instance from the target service set based on the identifier of the target service set, where the target service set includes the second service instance, the third service instance, and the fourth service instance.

Optionally, the communications interface 1610 is further configured to send the identifier of the target service set to an NRF network element.

The communications interface 1610 is further configured to receive an identifier of the second service instance that is sent by the NRF network element, to determine the second service instance.

Optionally, the communications interface 1610 is further configured to receive first information sent by a service instance in the target service set. The first information includes an identifier of the service instance and the identifier of the target service set. The processor 1620 is configured to determine the second service instance from the target service set based on the identifier of the target service set and the first information.

Optionally, the processor 1620 is further configured to obtain the identifier of the target service set from the target identifier, where the target identifier includes the identifier of the target service set.

Alternatively, the processor 1620 is further configured to: when the target identifier includes the identifier of the third service instance, obtain the identifier of the target service set based on the identifier of the third service instance, where the target service set includes the third service instance.

Optionally, the target identifier includes an identifier of the first session group, and the first session group includes the first session.

The communications interface 1610 is further configured to send the identifier of the first session group to the NRF network element.

The communications interface 1610 is further configured to receive the identifier of the second service instance that is sent by the NRF network element, to determine the second service instance.

Optionally, the communications device 1600 is a UPF network element, and the second service instance, the third service instance, and the fourth service instance are SMF network elements.

An embodiment of this application provides a communications device. The communications device may be configured to perform the steps performed by the third service instance in the method in FIG. 10. For example, the communications device includes a unit configured to perform the method/step/function performed by the third service instance in FIG. 10.

An embodiment of this application provides a communications system. The communications system includes a transceiver and a processor. The transceiver communicates with the processor through an internal connection path. The processor is configured to control a receiver to receive a signal and control a transmitter to send a signal. Optionally, the communications device further includes a memory. The transceiver, the memory, and the processor communicate with each other through an internal connection path. The memory is configured to store an instruction. The processor is configured to execute the instruction stored in the memory, to control the receiver to receive a signal and control the transmitter to send a signal, to enable the device to perform the method/step/function performed by the third service instance in FIG. 10.

An embodiment of this application provides a communications system. The communications system includes a first service instance. The first service instance is configured to perform the steps performed by the first service instance in the method in FIG. 10.

Optionally, the system may further include a third service instance. The third service instance is configured to perform the steps performed by the third service instance in the method in FIG. 10.

Optionally, the system may further include another device. The other device is configured to interact with the first service instance and/or the third service instance. The other device may be, for example, an access management function network element. The access management function network element may be configured to perform a method performed by an access management function network element in the solution provided in FIG. 10.

An embodiment of this application provides a computer program product. The computer program product includes computer program code. The computer program code is run by a computer, to implement the functions of the foregoing service instance and service communication proxy.

An embodiment of this application provides a computer-readable medium. The computer-readable medium is configured to store a computer program. The computer program includes an instruction used to implement the functions of the foregoing service instance and service communication proxy.

An embodiment of this application provides a communications chip. The communications chip stores an instruction. The instruction is run on a computer device, to implement the functions of the foregoing service instance and service communication proxy.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed operating process of the foregoing systems, devices, and units, refer to corresponding processes in the foregoing method embodiments, and details are not described herein again.

In the several embodiments provided in this application, it should be understood that the disclosed systems, devices, and methods may be implemented in other manners. For example, the described device embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, to be more specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication system comprising:
   a third service instance configured to send a first message related to a session, wherein the first message comprises a target identifier, and wherein the target identifier comprises a first identifier of the third service instance; and
   a first service instance configured to:
      receive the first message from the third service instance;
      determine, based on the target identifier, a second service instance to provide a service for the session when the third service instance is unavailable; and
      send a second message related to the session to the second service instance.

2. The communication system according to claim 1, wherein the first service instance is configured to:
   obtain a second identifier of a target service set based on the target identifier; and
   determine the second service instance from the target service set based on the second identifier, wherein the target service set comprises the third service instance and the second service instance.

3. The communication system according to claim 2, wherein the first service instance is further configured to receive first information from the third service instance, wherein the first information comprises the first identifier and the second identifier, wherein the target service set comprises the second service instance and the third service instance, and wherein the third service instance is further configured to send the first information to the first service instance.

4. The communication system according to claim 3, wherein the first service instance is further configured to receive second information from the second service instance, wherein the second information comprises the second identifier and a third identifier of the second service instance, and wherein the second service instance is configured to send the second information to the first service instance.

5. The communication system according to claim 4, wherein the first service instance is further configured to determine the second service instance based on the second identifier and the second information.

6. The communication system according to claim 4, wherein the first information is included in a first N4 association setup message exchanged between the first service instance and the third service instance, and wherein the second information is included in a second N4 association setup message exchanged between the first service instance and the second service instance.

7. The communication system according to claim 1, wherein the first service instance is a user plane function (UPF) network element, and wherein the second service instance and the third service instance are session management function (SMF) network elements.

8. A communications apparatus, comprising:
   a processor; and
   a memory coupled to the processor and storing instructions that, when executed by the processor, cause the communications apparatus to:
      receive a first message related to a session from a third service instance, wherein the first message comprises a target identifier, and wherein the target identifier comprises a first identifier of the third service instance;

determine, based on the target identifier, a second service instance to provide a service for the session when the third service instance is unavailable; and send a second message related to the session to the second service instance.

9. The communications apparatus according to claim 8, wherein the instructions cause the communications apparatus to:

obtain a second identifier of a target service set based on the target identifier; and determine the second service instance from the target service set based on the second identifier, wherein the target service set comprises the third service instance and the second service instance.

10. The communications apparatus according to claim 9, wherein the instructions further cause the communications apparatus to receive first information from the third service instance, and wherein the first information comprises the first identifier and the second identifier.

11. The communications apparatus according to claim 10, wherein the instructions further cause the communications apparatus to:

receive second information from the second service instance, wherein the second information comprises the second identifier and a third identifier of the second service instance; and determine the second service instance based on the second identifier and the second information.

12. The communications apparatus according to claim 11, wherein the first information is included in a first N4 association setup message exchanged between the communications apparatus and the third service instance, and wherein the second information is included in a second N4 association setup message exchanged between the communications apparatus and the second service instance.

13. The communications apparatus according to claim 8, wherein the communications apparatus is a user plane function (UPF) network element, and wherein the second service instance and the third service instance are session management function (SMF) network elements.

14. A communication method, comprising:

sending, by a third service instance, a first message related to a session to a first service instance, wherein the first message comprises a target identifier, and wherein the target identifier comprises a first identifier of the third service instance;

receiving, by the first service instance, the first message;

determining, by the first service instance based on the first identifier, a second service instance to provide a service for the session when the third service instance is unavailable; and sending, by the first service instance, a second message related to the session to the second service instance.

15. The method according to claim 14, wherein determining the second service instance comprises:

obtaining, by the first service instance, a second identifier of a target service set based on the first identifier; and determining, by the first service instance, the second service instance from the target service set based on the second identifier, wherein the target service set comprises the second service instance and the third service instance.

16. The method according to claim 15, further comprising:

sending, by the third service instance, first information to the first service instance, wherein the first information comprises the first identifier and the second identifier, and wherein the target service set comprises the second service instance and the third service instance; and receiving, by the first service instance, the first information.

17. The method according to claim 16, further comprising:

sending, by the second service instance, second information to the first service instance, wherein the second information comprises the second identifier and a third identifier of the second service instance;

receiving, by the first service instance, the second information.

18. The method according to claim 17, wherein determining the second service instance comprises determining, by the first service instance, the second service instance based on the second identifier and second information.

19. The method according to claim 17, wherein the first information is included in a first N4 association setup message exchanged between the first service instance and the third service instance, and wherein the second information is included in a second N4 association setup message exchanged between the first service instance and the second service instance.

20. The method according to claim 14, wherein the first service instance is a user plane function (UPF) network element, and wherein the second service instance and the third service instance are session management function (SMF) network elements.

21. A communication method, comprising:

receiving, by first service instance, a first message related to a session from a third service instance, wherein the first message comprises a target identifier, and wherein the target identifier comprises a first identifier of the third service instance;

determining, by the first service instance, based on the target identifier, a second service instance to provide a service for the session when the third service instance is unavailable; and sending, by the first service instance, a second message related to the session to the second service instance.

22. The method according to claim 21, wherein determining the second service instance comprises:

obtaining, by the first service instance, a second identifier of a target service set based on the target identifier; and determining, by the first service instance, the second service instance from the target service set based on the second identifier, wherein the target service set comprises the third service instance and the second service instance.

23. The method according to claim 22, comprising receiving, by the first service instance, first information from the third service instance, wherein the first information comprises the first identifier and the second identifier.

24. The method according to claim 23, comprising:

receiving, by the first service instance, second information from the second service instance, wherein the second information comprises the second identifier and a third identifier of the second service instance; and determining, by the first service instance, the second service instance based on the second identifier and the second information.

25. The method according to claim 24, wherein the first information is included in a first N4 association setup message exchanged between the communications apparatus and the third service instance, and wherein the second information is included in a second N4 association setup message exchanged between the communications apparatus and the second service instance.

26. The method according to claim 21, wherein the communications apparatus is a user plane function (UPF) network element, and wherein the second service instance and the third service instance are session management function (SMF) network elements.

* * * * *